United States Patent
Tanaka et al.

(10) Patent No.: US 7,340,092 B2
(45) Date of Patent: Mar. 4, 2008

(54) IMAGE PROCESSING DEVICE, IMAGE PROCESSING METHOD, PROGRAM FOR EXECUTING IMAGE PROCESSING, AND COMPUTER READABLE RECORDING MEDIUM ON WHICH THE PROGRAM IS STORED

(75) Inventors: Yoshinori Tanaka, Tokyo (JP); Tsutomu Yamazaki, Odawara (JP); Masahiro Ozawa, Machida (JP); Yoko Fujiwara, Tokyo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 689 days.

(21) Appl. No.: 10/322,700

(22) Filed: Dec. 19, 2002

(65) Prior Publication Data

US 2003/0118234 A1 Jun. 26, 2003

(30) Foreign Application Priority Data

| Dec. 21, 2001 | (JP) | ............................. 2001-389762 |
| Dec. 21, 2001 | (JP) | ............................. 2001-389763 |
| Dec. 21, 2001 | (JP) | ............................. 2001-389764 |

(51) Int. Cl.
*G06K 9/00* (2006.01)
(52) U.S. Cl. ...................... 382/170; 382/176; 382/190; 382/203; 358/540; 358/1.9
(58) Field of Classification Search ................ 382/173, 382/176, 190, 199, 204, 284, 229, 239, 273, 382/203, 170, 175; 358/540, 1.9, 2.2, 1.16
See application file for complete search history.

(56) References Cited

U.S. PATENT DOCUMENTS

| 5,555,362 | A | * | 9/1996 | Yamashita et al. .......... 715/517 |
| 5,587,808 | A | * | 12/1996 | Hagihara et al. ........... 358/462 |
| 5,892,843 | A | * | 4/1999 | Zhou et al. .................. 382/176 |
| 6,097,439 | A | * | 8/2000 | Goldberg ..................... 348/465 |
| 6,137,905 | A | * | 10/2000 | Takaoka ...................... 382/173 |

(Continued)

FOREIGN PATENT DOCUMENTS

JP 5-342408 12/1993

(Continued)

OTHER PUBLICATIONS

Notification of Reason for Refusal issued in corresponding Japanese application 2001-389762, and translation thereof.

(Continued)

*Primary Examiner*—Matthew C. Bella
*Assistant Examiner*—Ali Bayat
(74) *Attorney, Agent, or Firm*—Buchanan Ingersoll & Rooney PC

(57) ABSTRACT

An image processing device extracts graphic areas, for example, firstly from image data received, and then extracts other remaining areas, i.e., photographic and character areas. The areas that are extracted firstly can be photographic or character areas. This prevents the areas to be extracted firstly from being extracted accompanying with other areas under the influence of isolation processes to be executed on other areas. The image processing device also can establish the order of extraction of each area depending on the contents of the image data based on the user's operation.

41 Claims, 26 Drawing Sheets

U.S. PATENT DOCUMENTS

| | | | |
|---|---|---|---|
| 6,341,176 B1 * | 1/2002 | Shirasaki et al. | 382/229 |
| 6,690,492 B2 | 2/2004 | Nakajima | |
| 6,977,754 B2 * | 12/2005 | Matsumoto et al. | 358/1.9 |
| 2001/0050785 A1 * | 12/2001 | Yamazaki | 358/540 |
| 2002/0031270 A1 * | 3/2002 | Yamazaki | 382/229 |
| 2002/0081030 A1 * | 6/2002 | Slavin | 382/192 |
| 2002/0181792 A1 * | 12/2002 | Kojima | 382/239 |

FOREIGN PATENT DOCUMENTS

| | | |
|---|---|---|
| JP | 07-107275 | 4/1995 |
| JP | 09-212642 | 8/1997 |
| JP | 11-331571 | 11/1999 |
| JP | 2000-013612 | 1/2000 |
| JP | 2001-326815 | 11/2001 |

OTHER PUBLICATIONS

Notification of Reason for Refusal issued in corresponding Japanese application 2001-389763, and translation thereof.

Notification of Reason for Refusal issued in corresponding Japanese application 2001-389764, and translation thereof.

Decision of Refusal issued in corresponding Japanese Patent Application No. 2001-389763, and translation thereof.

* cited by examiner

[ BINARIZATION THRESHOLD VALUE FOR PIXEL IN QUESTION P(I,J)=P(2,2) ]
= Max(P(0,0),P(4,0),P(0,4),P(4,4))-Offset

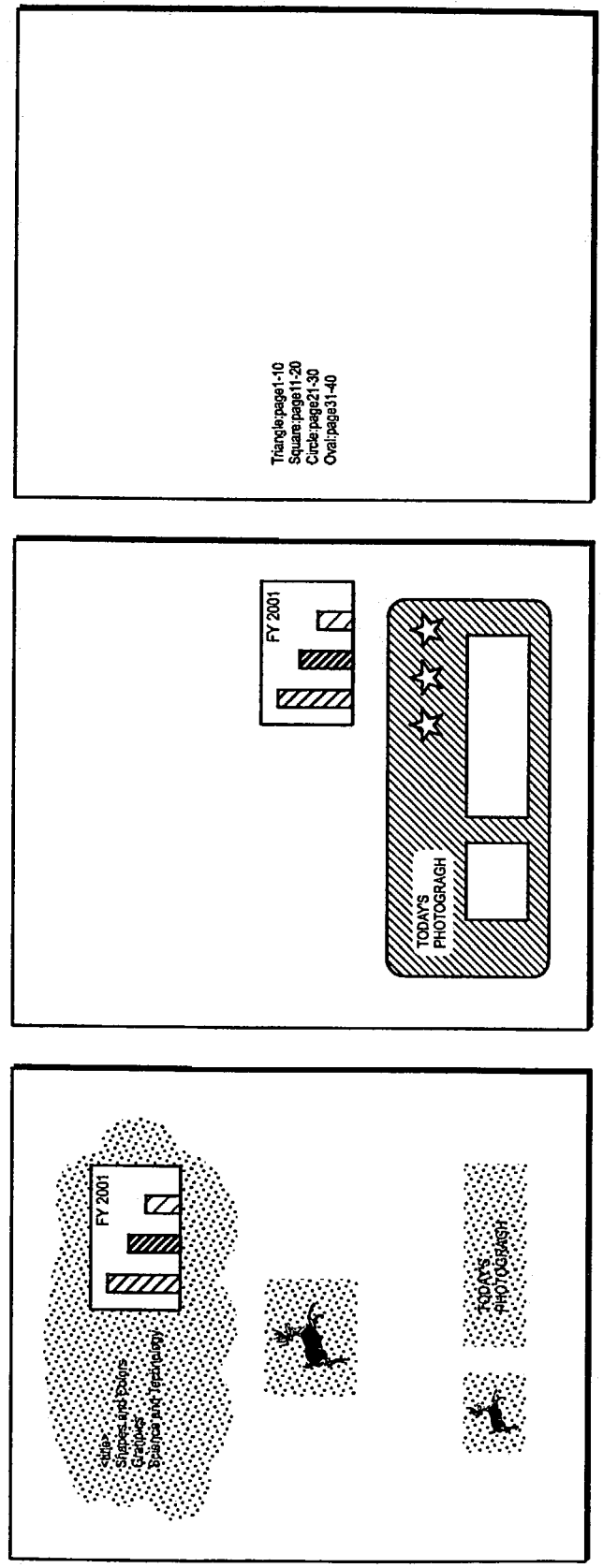

IMAGE PROCESSING DEVICE, IMAGE PROCESSING METHOD, PROGRAM FOR EXECUTING IMAGE PROCESSING, AND COMPUTER READABLE RECORDING MEDIUM ON WHICH THE PROGRAM IS STORED

This application is based on Japanese Patent Application Nos. 2001-389762, 2001-389763 and 2001-389764 filed on Dec. 21, 2001, the contents of which are hereby incorporated by reference.

BACKGROUND OF THE INVENTION

1. Field of the Invention

The invention relates to an image processing device, an image processing method, a program for executing image processing, and a computer readable recording medium on which the program is stored. In particular, the invention relates to an image processing device, an image processing method, a program for executing image processing, and a computer readable recording medium on which the program is stored that execute area separations for separating photographic areas, graphic areas and character areas from image data to be processed.

2. Description of the Related Art

Image processing technology has been known for identifying photographic areas, graphic areas, and character areas from image data obtained by scanning an original document, applying an appropriate image process to each, and then synthesizing the areas to produce output image data (e.g., Unexamined Publication No. JP-A-5-342408).

However, it is sometimes difficult to identify accurately the type of each area contained in the image data using the conventional art. For example, there is a great risk of making misjudgments in identifying areas when multiple types of areas are laid out in a complex manner or overlapping with each other in image data.

For example, if a graphic area is laid out in a photographic area overlapping with each other, there is a risk of overlooking the graphic area and extracting the entire area misjudging it as a photographic area. Therefore, if a compression process appropriate to photographic areas, such as the JPEG compression process, is applied to such an extracted area, the graphic area located in the photographic area may get compressed by the JPEG compression and may cause noises such as edge blurring. As a result, it may deteriorate a graphic image located in the photographic area. Also, since graphic images and character images share a common characteristic that both consist of line segments, a graphic area can be misjudged to be a character area and can be applied with a character recognition process.

As can be seen from the above, there was always a risk of not being able to extract graphic areas from the image data without fail even when it is desired to extract them concentrating on graphic areas that contain graphics images and apply processes that are suitable for graphic areas such as a vector transformation process, consequently ending up causing image deteriorations as a result of applying inappropriate processes to the graphic areas.

Moreover, if there is a part that is misjudged as a character area in a photographic area, there is a possibility of applying a binary process applicable to character areas by mistake to the part. Moreover, if there is a part that is misjudged as a graphic area in a photographic area, it can be painted by mistake with a single color in the downstream process as a result of a color reduction process that is applicable to graphic areas. Consequently, the picture quality of the photographic image can result in severe degradation.

As can be seen from the above, there was always a risk of not being able to extract photographic areas from the image data without fail even when it is desired to extract them concentrating on photographic areas that contain photographic images and reproduce the extracted photographic areas with a high image quality, consequently ending up causing image deterioration as a result of applying inappropriate processes to the photographic areas.

Moreover, if there exists a character image overlapping a photographic image or a graphic image in image data, there is a risk of overlooking the character area and extracting the entire area recognizing it as a photographic area or a graphic area. Also, if a compression process appropriate to photographic areas, such as the JPEG compression process, is applied to such an extracted area containing character images, the character images located in the photographic area may get deteriorated and may become illegible images when reproduced.

As can be seen from the above, there was always a risk of not being able to extract character areas without fail when it is desired to extract them concentrating on character areas that contain character images from image data and execute processes appropriate for character areas such as the character recognition process, consequently ending up not only being unable to perform character recognition processes sufficiently on the character images but also causing inappropriate processes to the character images.

On the other hand, depending on the contents of the original document, the user may want to apply processes appropriate to graphic areas such as a vector transformation to graphic areas as the graphic areas of the image data are important, or may want to reproduce photographic areas as the photographic areas are important, or may want to perform character recognition processes to character images in other areas as the character areas are important. In other words, it is desirable to be able to perform any processes on the image data depending on the contents of the original document.

SUMMARY OF THE INVENTION

It is an object of the present invention to provide an image processing device, an image processing method, a program for executing image processing, and a computer readable recording medium on which the program is stored for securely extracting a specific area among photographic, graphic and character areas contained in the image data obtained by scanning in order to execute processes appropriate to the attributes of the specific area.

A more specific object of the present invention is to provide an image processing device, an image processing method, a program for executing image processing, and a computer readable recording medium on which the program is stored for securely extracting an important area preferably according to the contents of image data among photographic, graphic and character areas contained in the image data obtained by scanning.

Also, amore specific object of the present invention is to provide an image processing device, an image processing method, a program for executing image processing, and a computer readable recording medium on which the program is stored for securely extracting a graphic area among the image data obtained by scanning in order to execute processes appropriate to the graphic area in the image data.

Also, amore specific object of the present invention is to provide an image processing device, an image processing method, a program for executing image processing, and a computer readable recording medium on which the program is stored for securely extracting a photographic area among the image data obtained by scanning in order to reproduce the photographic area in the image data with a high quality.

Also, amore specific object of the present invention is to provide an image processing device, an image processing method, a program for executing image processing, and a computer readable recording medium on which the program is stored for securely extracting a character area among the image data obtained by scanning in order to execute processes appropriate to the character area in the image data.

According to an aspect of the invention, there is provided an image processing device comprising: a first setup means for setting up an area to be extracted firstly among photographic, graphic and character areas from image data to be processed; and an area separating means for extracting firstly the area set up by the first setup means from the image data, and then extracting the remaining two areas.

According to the invention, it is possible to set up the order of extraction for each area in separating photographic areas, graphic areas, and character areas from the image data. Thus, it is possible to control which areas to be extracted preferentially.

According to another aspect of the invention, there is provided an image processing method comprising the steps of: 1) setting up an area to be extracted firstly among photographic, graphic and character areas from image data to be processed; 2) extracting the area set up in the step 1) from the image data; and 3) extracting the remaining two areas from the data remaining after extracting the area set up in the step 1) from the image data.

According to still another aspect of the invention, there is provided a program that causes a computer to execute image processing comprising the steps of: 1) setting up an area to be extracted firstly among photographic, graphic and character areas from image data to be processed; 2) extracting the area set up in the step 1) from the image data; and 3) extracting the remaining two areas from the data remaining after extracting the area set up in the step 1) from the image data.

According to a further aspect of the invention, there is provided an image processing device comprising: a first extracting means for extracting a graphic area ahead of photographic and character areas from image data to be processed; and a second extracting means for extracting the photographic and character areas from the data remaining after extracting the graphic area from the image data.

According to this invention, it is possible to separate photographic areas and character areas from the residual data after graphic areas are extracted firstly from the image data to be processed. Consequently, graphics areas will not be extracted in accordance with other areas influenced by the separation processes for the other areas. This allows the graphic areas to be securely extracted without being confused with the other areas. Consequently, when the application of processes appropriate to the graphic areas such as the vector transformation is the main object, it makes it possible to execute an appropriate process to the areas by securely extracting as many graphic areas as possible.

According to a still further aspect of the invention, there is provided an image processing method comprising the steps of: extracting a graphic area ahead of photographic and character areas from image data to be processed; and extracting the photographic and character areas from the data remaining after extracting the graphic area from the image data.

According to a yet further aspect of the invention, there is provided a program that causes a computer to execute image processing comprising the steps of: extracting a graphic area ahead of photographic and character areas from image data to be processed; and extracting the photographic and character areas from the data remaining after extracting the graphic area from the image data.

According to a yet further aspect of the invention, there is provided an image processing device comprising: a first extracting means for extracting a photographic area ahead of graphic and character areas from image data to be processed; and a second extracting means for extracting the graphic and character areas from the data remaining after extracting the photographic area from the image data.

According to this invention, it is possible to separate graphic areas and character areas from the residual data after photographic areas are extracted firstly from the image data to be processed. Consequently, photographic areas will not be extracted in accordance with other areas influenced by the separation processes for the other areas. This allows the photographic areas to be securely extracted without being confused with the other areas. Consequently, when the high quality reproduction of the photographic areas is the main object, it makes it possible to execute an appropriate process to the areas by securely extracting as many photographic areas as possible.

According to a yet further aspect of the invention, there is provided an image processing method comprising the steps of: extracting a photographic area ahead of graphic and character areas from image data to be processed; and extracting the character and graphic areas from the data remaining after extracting the photographic area from the image data.

According to a yet further aspect of the invention, there is provided a program that causes a computer to execute image processing comprising the steps of: extracting a photographic area ahead of graphic and character areas from image data to be processed; and extracting the character and graphic areas from the data remaining after extracting the photographic area from the image data.

According to a yet further aspect of the invention, there is provided an image processing device comprising: a first extracting means for extracting a character area ahead of photographic and graphic areas from image data to be processed; and a second extracting means for extracting the photographic and graphic areas from the data remaining after extracting the character area from the image data.

According to this invention, it is possible to separate photographic areas and graphic areas from the residual data after character areas are extracted firstly from the image data to be processed. Consequently, character areas will not be extracted in accordance with other areas influenced by the separation processes for the other areas. This allows the character areas to be securely extracted without being confused with the other areas. Consequently, when the application of processes appropriate to the character areas such as the character recognition process is the main object, it makes it possible to execute an appropriate process to the areas by securely extracting as many character areas as possible.

According to a yet further aspect of the invention, there is provided an image processing method comprising the steps of: extracting a character area ahead of photographic and graphic areas from image data to be processed; and extracting the photographic and graphic areas from the data remaining after extracting the character area from the image data.

According to a yet further aspect of the invention, there is provided a program that causes a computer to execute image processing comprising the steps of: extracting a character area ahead of photographic and graphic areas from image data to be processed; and extracting the photographic and graphic areas from the data remaining after extracting the character area from the image data.

The objects, features, and characteristics of this invention other than set forth above will become apparent from the descriptions given herein below with reference to preferred embodiments illustrated in the accompanying drawings.

BRIEF DESCRIPTION OF THE DRAWINGS

FIG. 29A is a diagram showing the photographic areas extracted firstly from the image data of FIG. 5 in the area separation process of the first mode;

FIG. 29B is a diagram showing the graphic areas extracted secondly from the image data of FIG. 5 in the area separation process of the first mode;

FIG. 29C is a diagram showing the character areas extracted thirdly from the image data of FIG. 5 in the area separation process of the first mode;

DETAILED DESCRIPTION OF THE PREFERRED EMBODIMENT

The embodiment of this invention will be described below with reference to the accompanying drawings.

Figure 1:
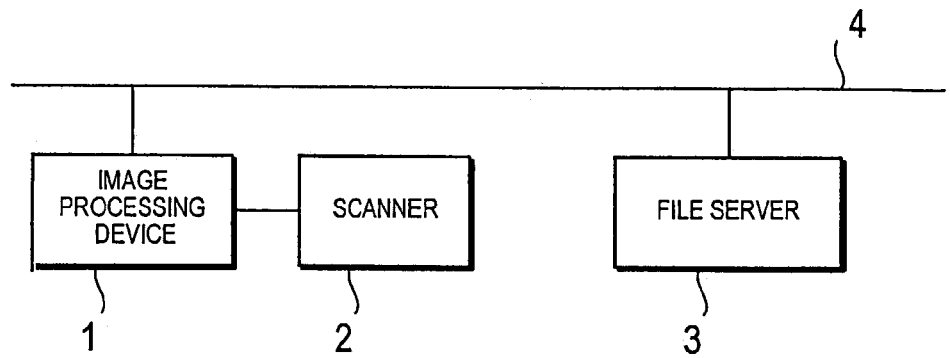
FIG. 1 is a block diagram showing the entire constitution of an image processing system including an image processing device according to an embodiment of the present invention.

FIG. 1 is a block diagram showing the entire constitution of an image processing system including an image processing device according to an embodiment of the present invention. This image processing system is equipped with an image processing device 1, a scanner 2, and a file server 3, and they are connected with each other communicably via a computer network 4. The types and the number of equipment to be connected to the computer network are not limited to those shown in FIG. 1.

Figure 2:
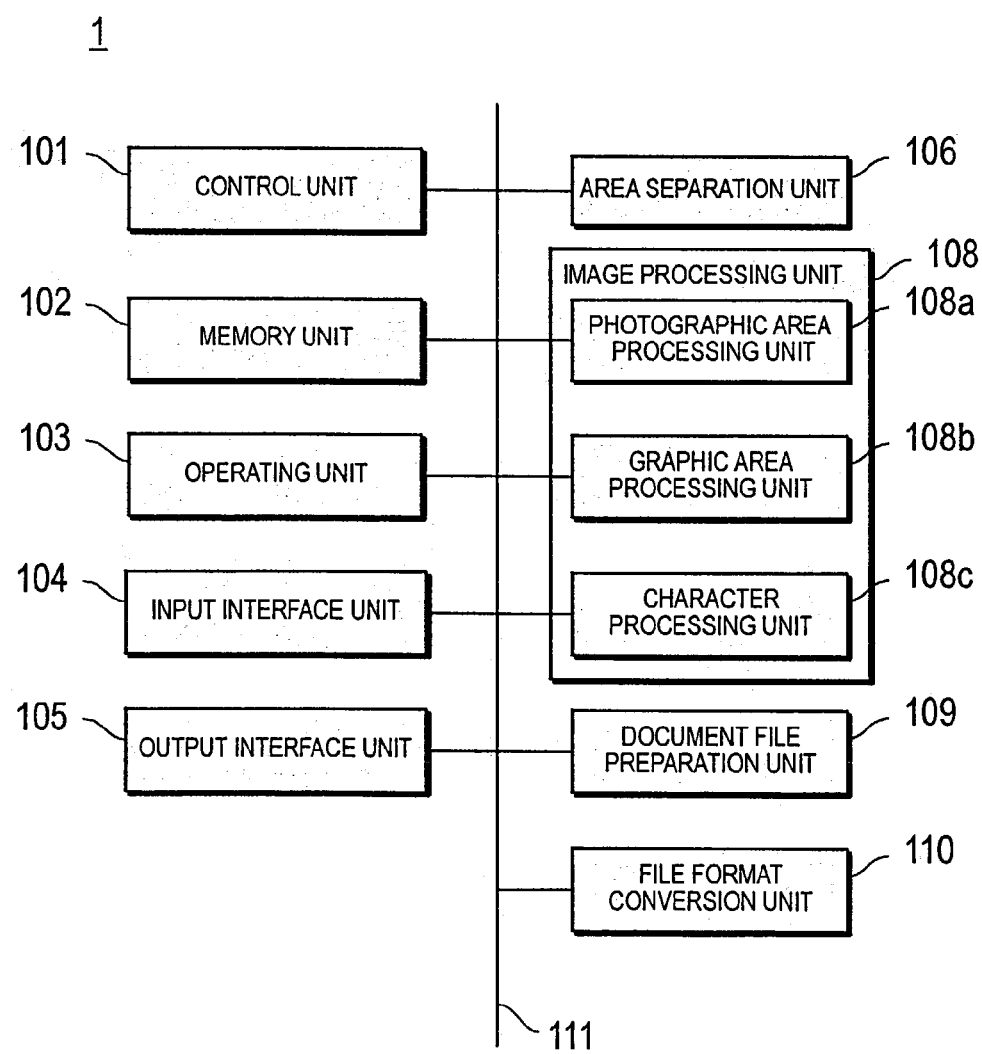
FIG. 2 is a block diagram showing the constitution of the image processing device.

FIG. 2 is a block diagram showing the constitution of the image processing device 1 according to the present embodiment. The image processing device 1 in FIG. 2 includes a control unit 101, a memory unit 102, an operating unit 103, an input interface unit 104, an output interface unit 105, an area separation unit 106, an image processing unit 108, a document file preparation unit 109, and a file format conversion unit 110, and they are connected with each other via a bus 111 for exchanging signals.

The control unit 101 is a CPU, and controls various parts indicated above and executes various arithmetic processes according to programs. The memory unit 102 includes a ROM for storing various programs and parameters, a RAM for temporarily storing programs and data, a hard disk used for storing programs and parameters and temporarily storing image data obtained from image processing, and others.

Figure 3:
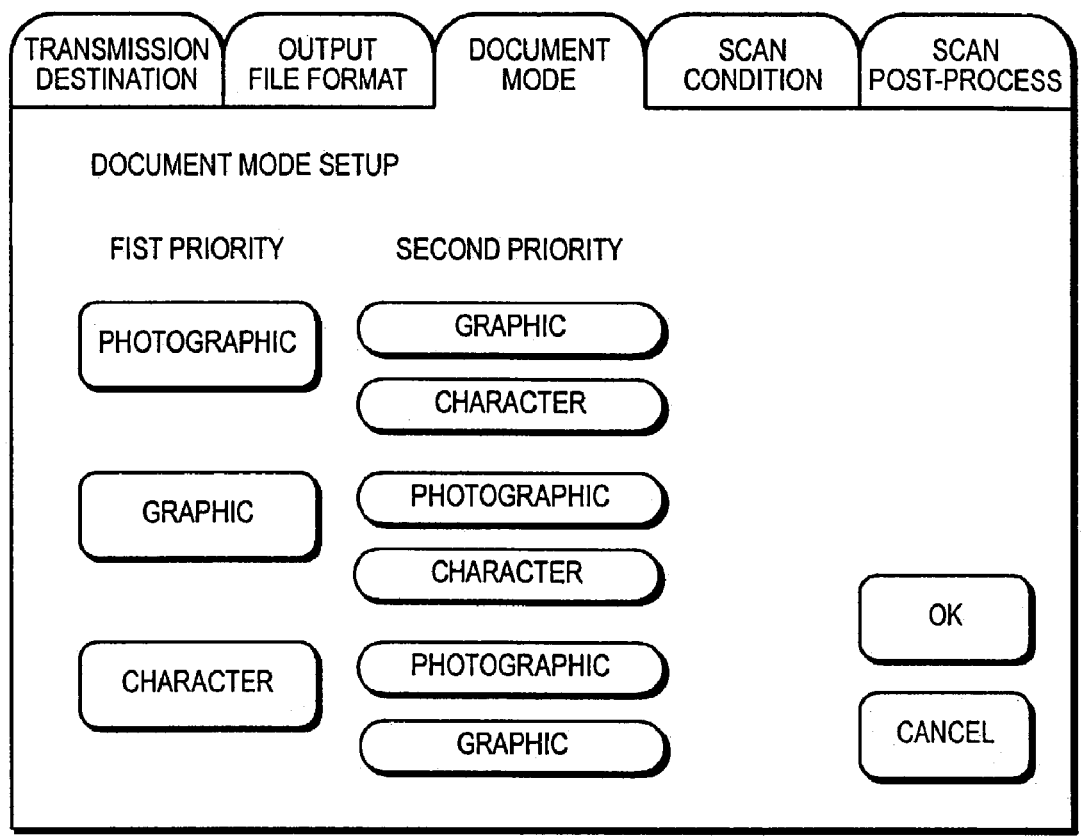
FIG. 3 is an example image of the document mode setup screen of the operating unit.

The operating unit 103 contains keys for setting various items and instructing the start of operation, an operating panel, etc. As shown in FIG. 3, the items that can be set up include the destinations of image data transmissions, output file formats, document mode, scanning conditions, and post-processes after scanning.

The input interface unit 104 is an interface for receiving data such as image data and instructions, while the output interface unit 105 is an interface for transmitting instructions and data such as output files.

The area separation unit 106 separates photographic areas, graphic areas and character areas from the image data. The image processing unit 108 consists of a photographic area processing unit 108a, a graphic area processing unit 108b and a character area processing unit 108c. Each of these area processing units 108a through 108c provides an image process appropriate for each type of area, i.e., character areas, graphic areas, and photographic areas extracted separately by means of the area separation unit 106.

The document file preparation unit 109 prepares a document file according to the internal file format by synthesizing each area containing images processed and transmitted by the photographic area processing unit 108a, the graphic area processing unit 108b, and the character area processing unit 108c respectively. The file format conversion unit 110 converts document files prepared in the internal file format into the preset output file format. Incidentally, the output file formats include various document formats according to various word processing software, and general purpose formats such as PostScript®, PDF, JPEG, and TIFF.

The scanner 2 scans (reads) documents to generate image data and transmit the obtained image data to the image processing device.

The file server 3 is a computer that stores files received via the computer network 4 and transfers the stored files to other equipment on the computer network upon receiving transfer requests.

The computer network 4 can be a LAN connecting computers, peripheral equipment, network equipment, etc., according to standards such as Ethernet®, Token Ring, and FDDI, or a WAN that consists of several LANs connected by a dedicated line.

Figure 4:
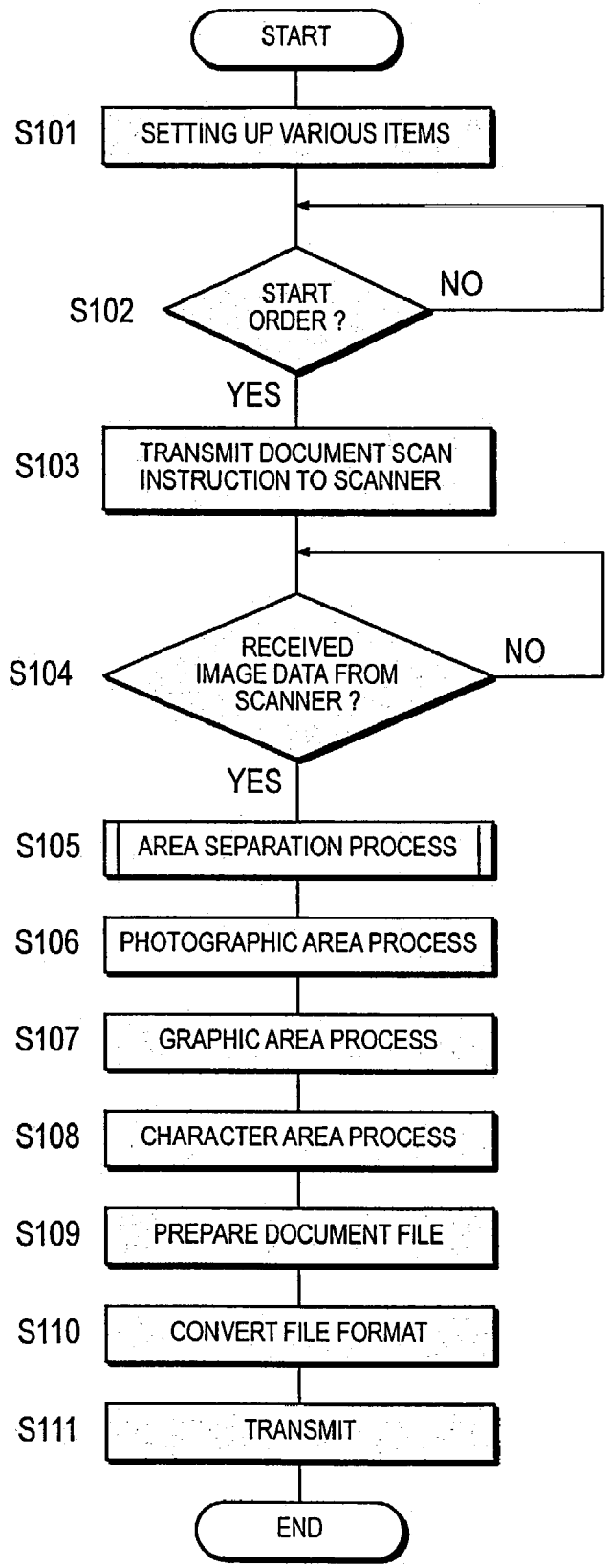
FIG. 4 is a flow chart showing the process procedure on the image processing device.

Next, let us describe with reference to FIG. 4 the process steps of the image processing device 1 according to this embodiment. The algorithm shown in the flow chart of FIG. 4 is stored as a program in the memory unit 102 of the image processing device 1 and executed by the control unit 101.

First, in the step 101, various items are set up. For example, the transmission destination of the image data, the output file format, the document mode, the scan condition, and the post-process after scanning are set up here. The setup of the transmission destination of the image data is executed by entering the IP address, host name or mail address of the image output destination device. The output file format setup is done by selecting the file format of the output file to be transmitted to the image output destination device.

The document mode setup is performed by selecting which area is to be given a priority among photographic areas containing photographic images, graphic areas containing graphic images, and character areas containing character images. Incidentally, photographic images are images with continuously changing gradations such as photograph or picture pattern. Also, graphic images are images consisting of lines and solid picture patterns such as images created using a personal computer.

As shown in FIG. 3, the user can select via the operating unit 103 areas that are desired to be processed with the highest priority (the first priority areas) and the areas that are desired to be processed with the second highest priority (the second priority areas). If the selection of the first priority areas and/or the second priority areas by the user is not done, the order of priority of the areas is determined according to the specified default values.

The scanning condition setup is done by specifying scanning areas, scanning resolutions, selection of color or monochromatic, etc. The scanning post-processing setup is done by specifying the character recognition process, the vector transformation process, the image compression method, the color reduction method, the output resolution, etc.

In the step S102, the system waits for the image process start instruction. The start instruction is performed by the user's operation on the start key of the operating unit 103, for example.

In the step S103, a document scan instruction is issued to the scanner 2 via the output interface unit 105. Here, the scanner 2, upon receiving a document scan instruction from the image processing device 1, obtains image data by scanning a document set at the specified position, and transmits the obtained image data to the image processing device 1.

In the step S104, the scanner 2 waits for receiving image data via the input interface unit 104. Here, when image data is received from the scanner 2, the received image data (RGB image data) is then stored into the memory unit 102.

Figure 5:
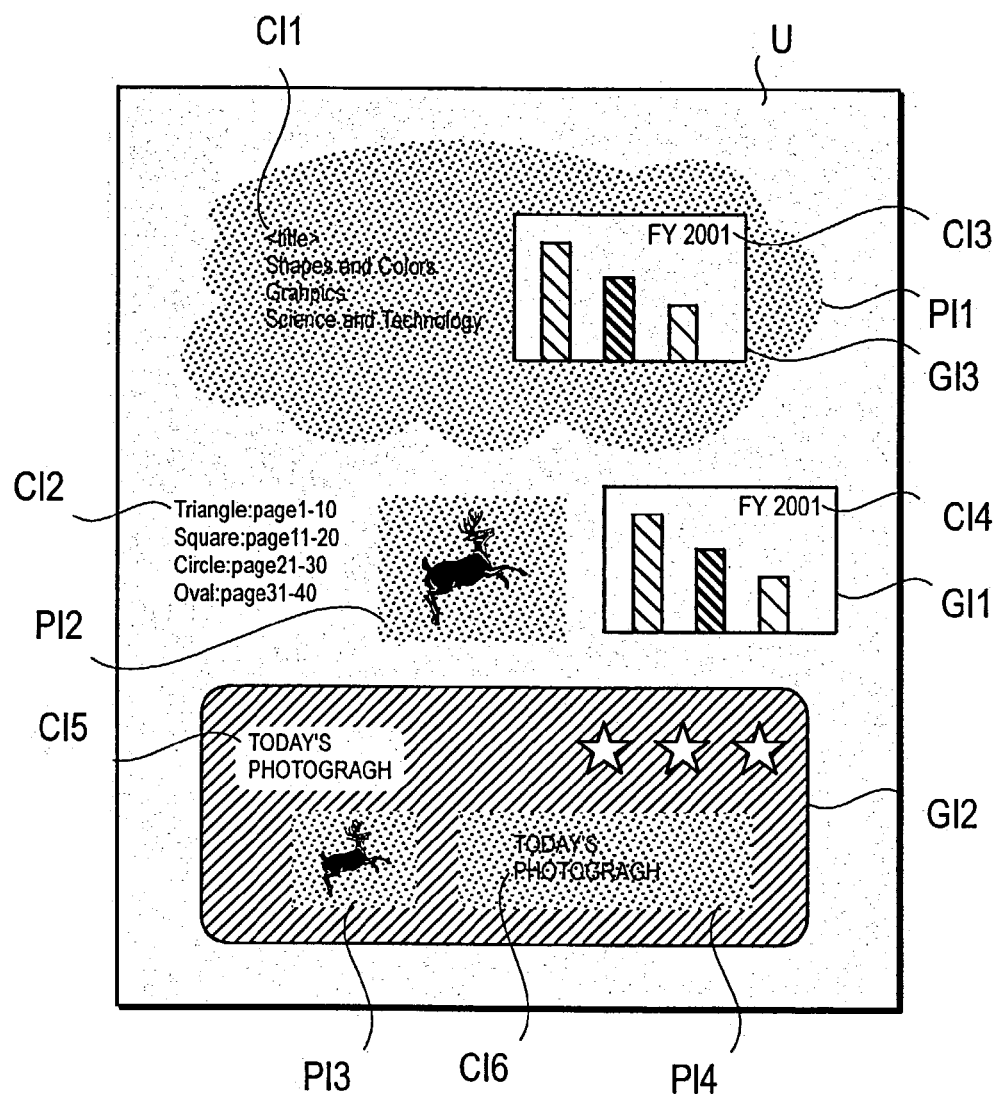
FIG. 5 is a schematic diagram showing an example image data received from a scanner.

FIG. 5 is a schematic diagram showing an example of the received image data. The image data shown in FIG. 5 consists of photographic images PI1 through PI4, graphic images GI1 through GI3, character images CI1 through CI6, and the background U. As can be seen from the diagram, the graphic image GI3, and the character images CI1 and CI3 are located in the photographic image PI1, while photographic images PI3 and PI4, and character images C15 and C16 are located in the graphic image GI2. Here, the background means the areas in image data other than photographic areas, graphic areas, and character areas, for example, the parts in image data that corresponds to the parts where the paper color of the original document remains as no printing is made there.

The image processing start instruction can be entered from other equipment on the computer network 4, or from the scanner 2.

In the step S105, the area separation unit 106 separates photographic areas, graphic areas and character areas from the image data received from the scanner 2, in other words, the image data to be processed. In this embodiment, the area separation unit 106 extracts the first priority areas firstly from the image data according to the document mode setup by the user's selection via the operating unit 103, and then separates the remaining two areas from the data that remains after extracting the first priority areas from the image data. Further, if the second priority areas are selected, the second priority areas are extracted from the data that remains after extracting the first priority areas from the image data prior to separation of the remaining two areas. Here, images in the three kinds of areas are reproduced by each area and each area is extracted as an area containing images. The detail of the steps in the area separation procedure will be described later.

In the step S106, processes appropriate for photographic areas will be applied to photographic areas separated in the step S105. For example, the photographic area processing unit 108a applies the resolution conversion to the photographic images in the photographic areas, then applies the irreversible compression process for color images to them, and then stores them with the position information in the memory unit 102.

In the step S107, processes appropriate for graphic areas will be applied to graphic areas separated in the step S105. For example, the graphic area processing unit 108b applies such processes as the smoothing process and the color reduction process to the graphic images in the graphic areas, then applies the reversible compression process for color images to them, and then stores them with the position information in the memory unit 102.

In the step S108, processes appropriate for character areas will be applied to character areas separated in the step S105. For example, the character image processing unit 108c binarizes the character images in the character areas, then applies the reversible compression process for 1 bit data to them, and then stores them with the color information and position information in the memory unit 102.

In the step S109, the document file preparation unit 109 synthesizes the above-mentioned three types of areas containing the processed images transmitted from the photographic area processing unit 108a, the graphic area processing unit 108b, and the character area processing unit 108c to produce a document file.

Figure 6A:
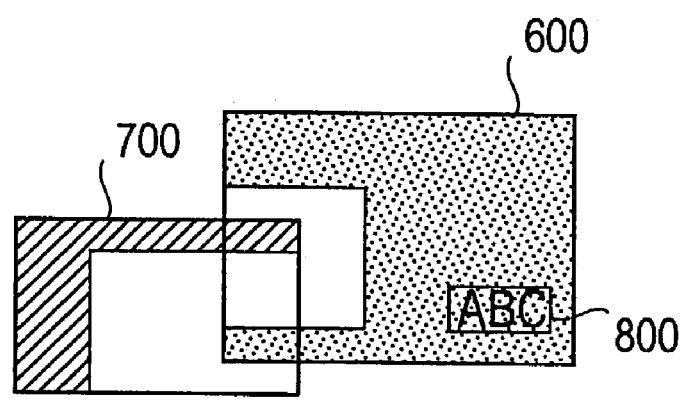
FIG. 6A is a diagram showing a status after a synthesis intended for describing the area synthesis process.
Figure 6B:
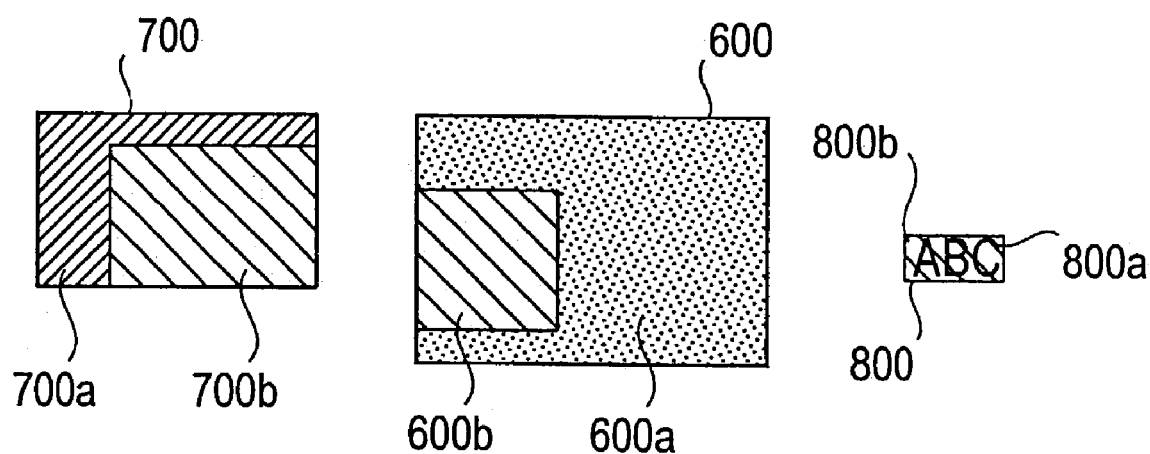
FIG. 6B is a diagram showing a status before a synthesis intended for describing the area synthesis process.
Figure 7:
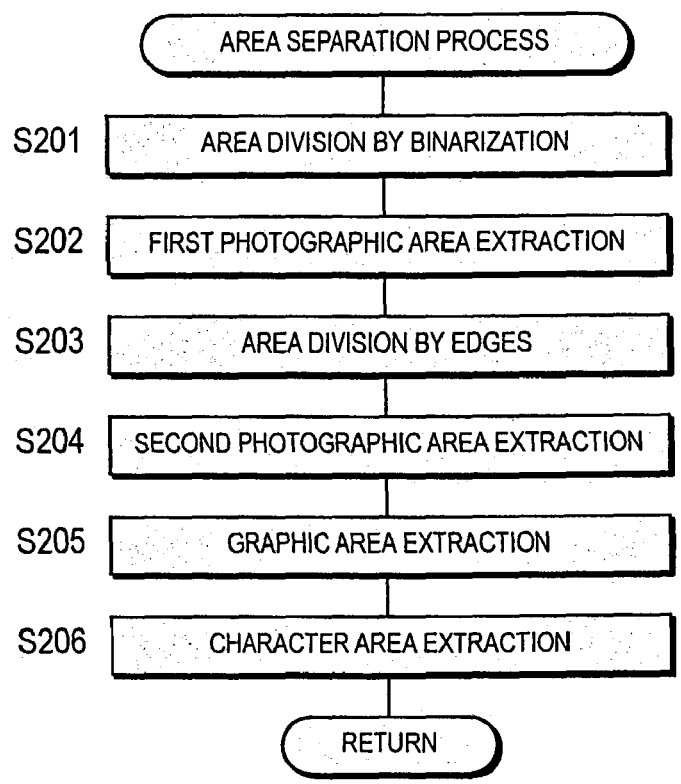
FIG. 7 is a flowchart showing the procedure of the area separation process of the first mode.
Figure 8:
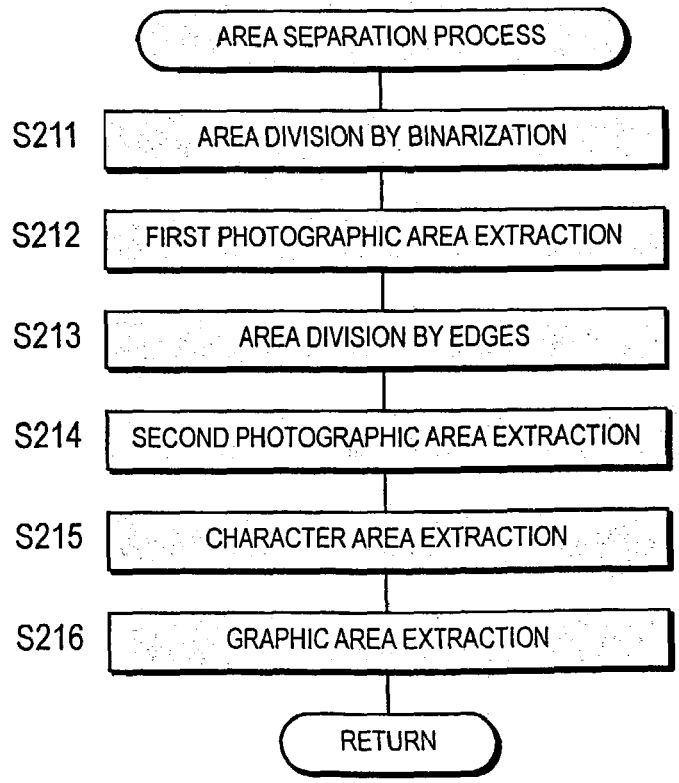
FIG. 8 is a flowchart showing the procedure of the area separation process of the second mode.
Figure 9:
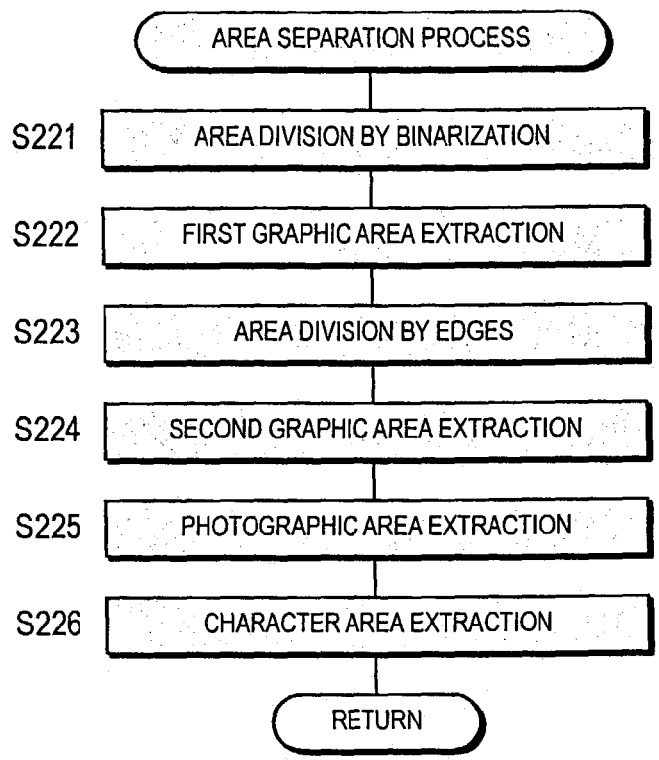
FIG. 9 is a flowchart showing the procedure of the area separation process of the third mode.
Figure 10:
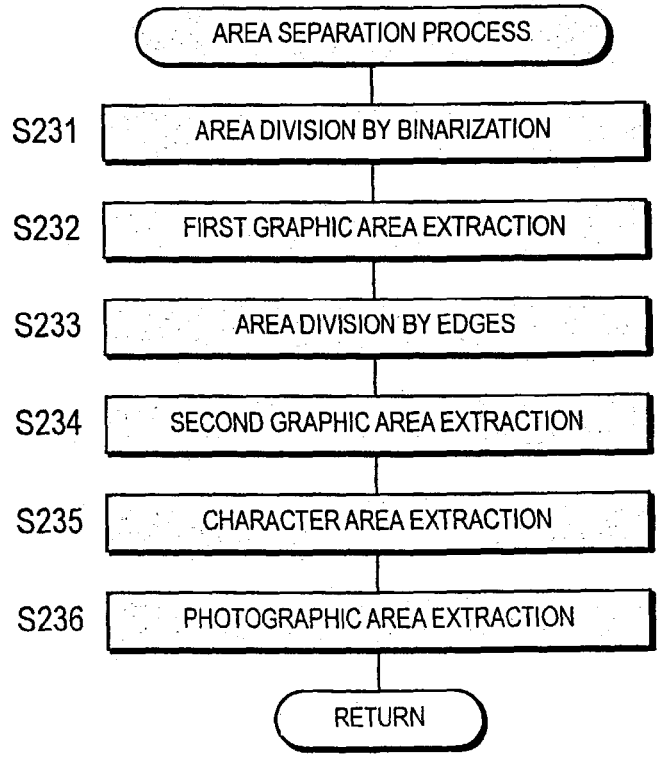
FIG. 10 is a flowchart showing the procedure of the area separation process of the fourth mode.
Figure 11:
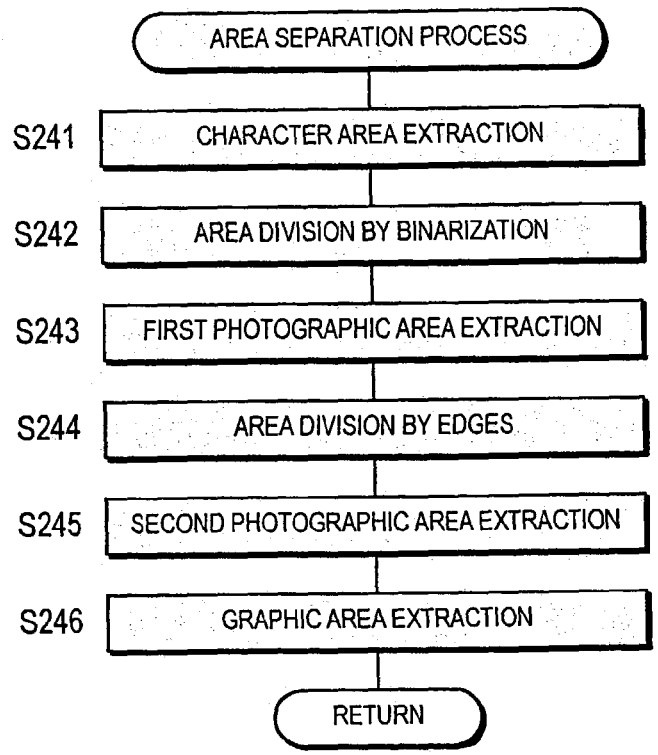
FIG. 11 is a flowchart showing the procedure of the area separation process of the fifth mode.
Figure 12:
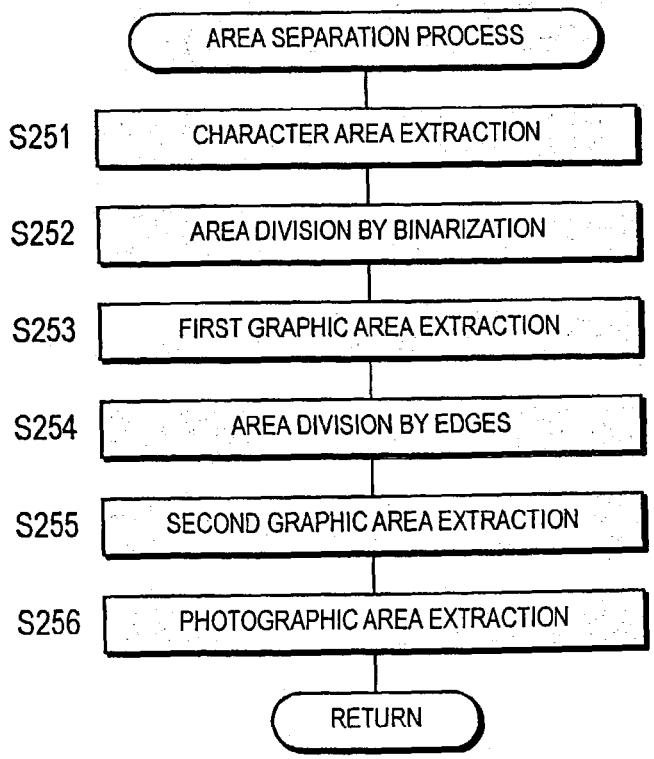
FIG. 12 is a flowchart showing the procedure of the area separation process of the sixth mode.

The synthesis of the areas is conducted, as shown in FIG. 6A, by outputting a photographic area 600, a graphic area 700, and a character area 800 onto the memory unit. Here, as shown in FIG. 6B, areas of the photographic area 600 other than a photographic image 600a, areas of the graphic area 700 other than a graphic image 700a, and areas of the character area 800 other than a character image 800a are designated as mask areas 600b, 700b and 800b respectively. Incidentally, the areas 600, 700 and 800 are defined as the circumscribing rectangles of the images 600a, 700a and 800a respectively. The masking area is an area where the masking process is applied in order to make the information recorded on the memory in advance effective. First, the photographic area 600 and the graphic area 700 are mask-processed and positioned, and then the character area 800 is mask-processed and positioned. The reason for mask-processing each area is that images in each area are not only in rectangular shaped but also images of other areas are allowed to intrude into the particular area. Thus, the images of the three areas are outputted onto the memory without causing any deficiencies as shown in FIG. 6A.

The reason for disposing the character areas after other areas are disposed is that, as described later, an interpolation process is done for interpolating the areas where the character images existed. In other words, it is intended to prevent the character image from becoming hidden by the interpolated parts in the areas to be positioned later if the character area is positioned ahead of other areas. If the interpolation process is applied to the areas where the graphic images existed after a graphic area is extracted, the areas are outputted onto the memory in the order of the photographic area, the graphic area and the character area.

In the step S110, the document file prepared in the step S109 is converted by the file format conversion unit 110 into a specified output file format.

In the step S111, the output file obtained in the step S110 is transmitted to the file server 3 via the output interface unit 105 and the computer network 4.

In this embodiment, the file server 3, upon receiving an output file from the image processing device 1 via the computer network 4, develops character images and graphic images from the received file, applies the character recognition process to the character images to covert them into character code data, applies the vector conversion process to the graphic images to convert them into vector data, and synthesized the converted data with photographic images again, and store the document file obtained by converting the result of synthesis into a specified type of file format into a specified directory in a memory device such as a hard disk. When it receives a transfer request for the file from other equipment on the computer network 4, it transfers the stored file to the other equipment via the computer network 4.

Next, let us now describe in more details concerning the steps of the area separation process in the step S105 as shown in FIG. 4, which is the feature of the image processing of the image processing device 1 in this embodiment.

FIG. 7 through FIG. 12 are the flowcharts showing the procedures of the area separation process according to the document mode. The total of six kinds of document modes is set up in the step S101 shown in FIG. 4. The document mode consist of the first mode (see FIG. 7) wherein the first and second priority areas are photographic and graphic areas respectively, the second mode wherein they are photographic and character areas respectively (see FIG. 8), the third mode wherein they are graphic and photographic areas (see FIG. 9), the fourth mode wherein they are graphic and character areas respectively (see FIG. 10), the fifth mode wherein they are character and photographic areas respectively (see FIG. 11), and the sixth mode wherein they are character and graphic areas respectively (see FIG. 12).

Each area separation process shown in FIG. 7 through FIG. 12 includes processing blocks which are common in contents among these processes, i.e., the area division process based on binarization, the first photographic/graphic area extraction, the area division process by edges, the second photographic/graphic area extraction, the photographic/graphic separation, and the character area separation. In other words, each of these area separation processes deals with different areas of priorities, and has a different order of area extraction which depends on the priority order of each area. For example, in case of the first mode, the order of area priority from high to low is photographic areas, graphic areas, and character areas, and the order of extraction is the same.

Let us now describe in details about the contents of each processing block in the area separation process. Here the contents of each processing block are described specifically in the same order as the processing order of the first mode shown in FIG. 7.

Area Division Based on Binarization

Figure 13:
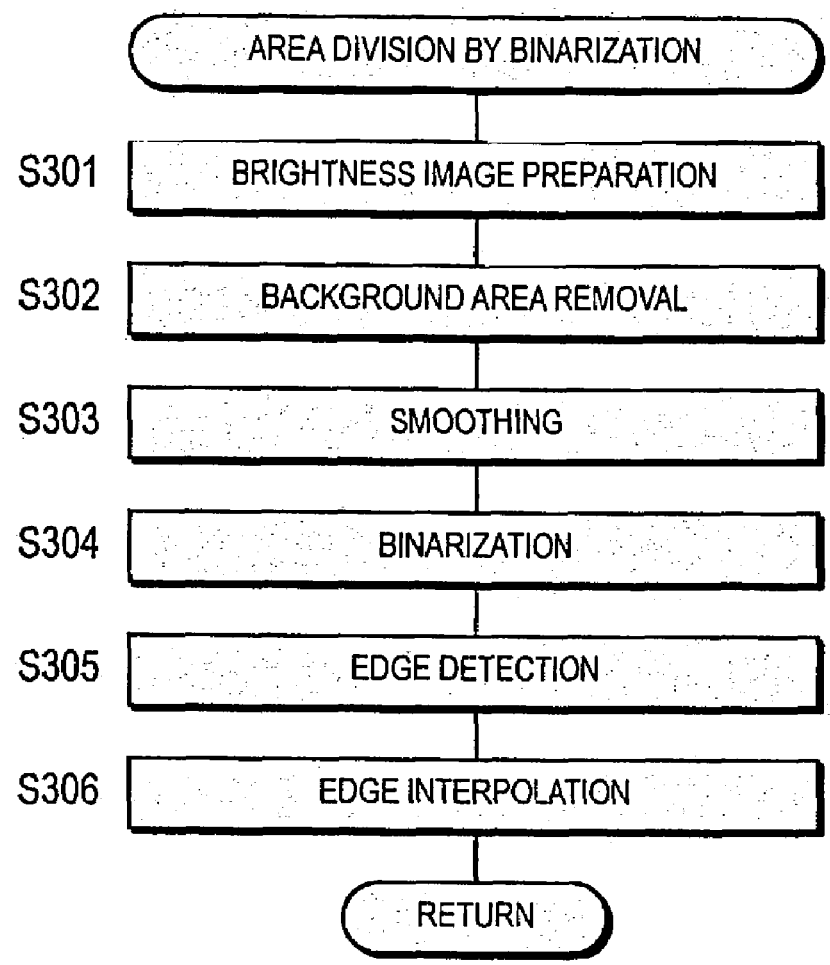
FIG. 13 is a flowchart showing the procedure of the area division process based on binarization.

First, let us describe the area division process based on binarization with reference to FIG. 13.

An image consisting of brightness, i.e., a brightness image is made based on the image data received shown in FIG. 5, for example (step S301). Next, the background is removed from the brightness image (step S302), and the smoothing process is applied using a smoothing filter (step S303). The brightness image, which is removed of the background and noises, is binarized at the brightness level of the background (hereinafter called "background level") (step S304). This provides a binarized image shown in FIG. 14, wherein all the areas except the background are blackened out. This binary image is then applied with a Laplacian filter, which is the second degree differential filter to detect edges (step S305). Next, the edges are interpolated by executing the closing (expansion and invasion) process that is a kind of morphology process to obtain an edge image consisting of edges (step S306, FIG. 15). The edge image of FIG. 15 corresponds to the contour line of the binary image shown in FIG. 14.

Figure 14:
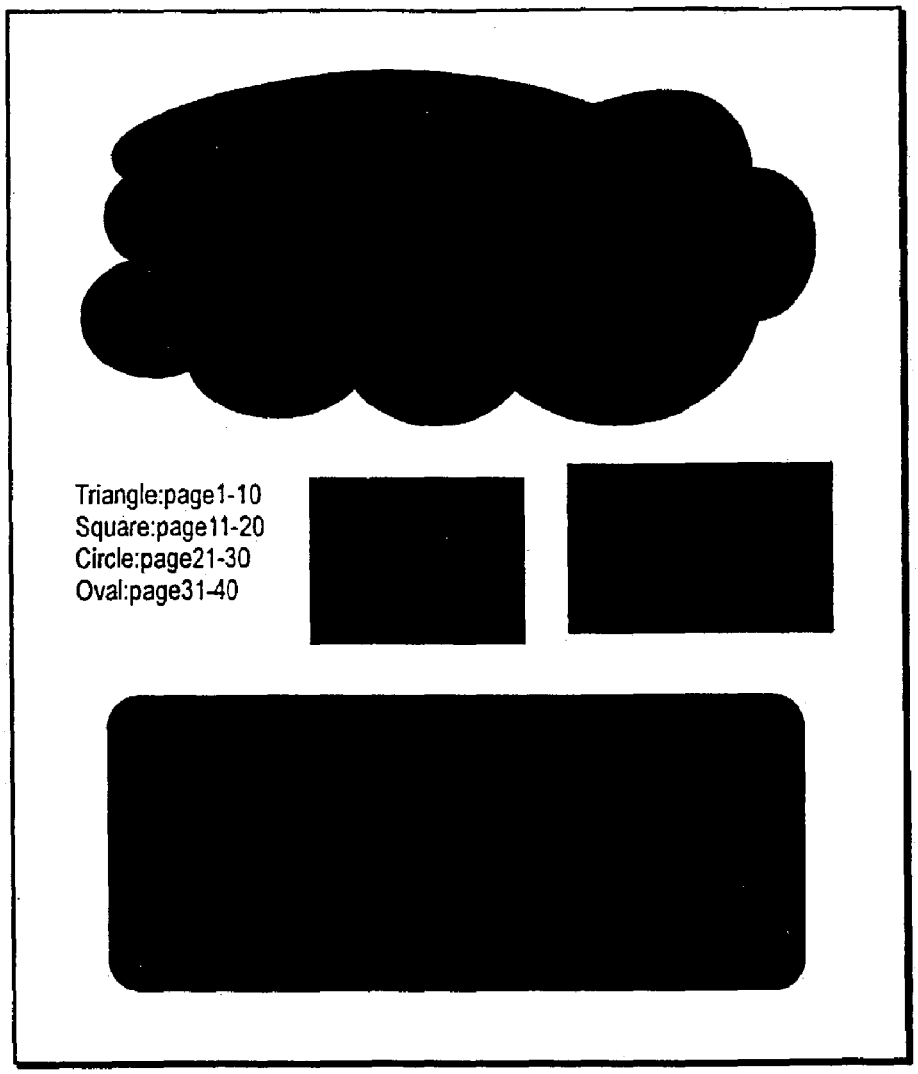
FIG. 14 is a diagram showing a binary image wherein the areas other than the background of FIG. 5 are blackened out.
Figure 15:
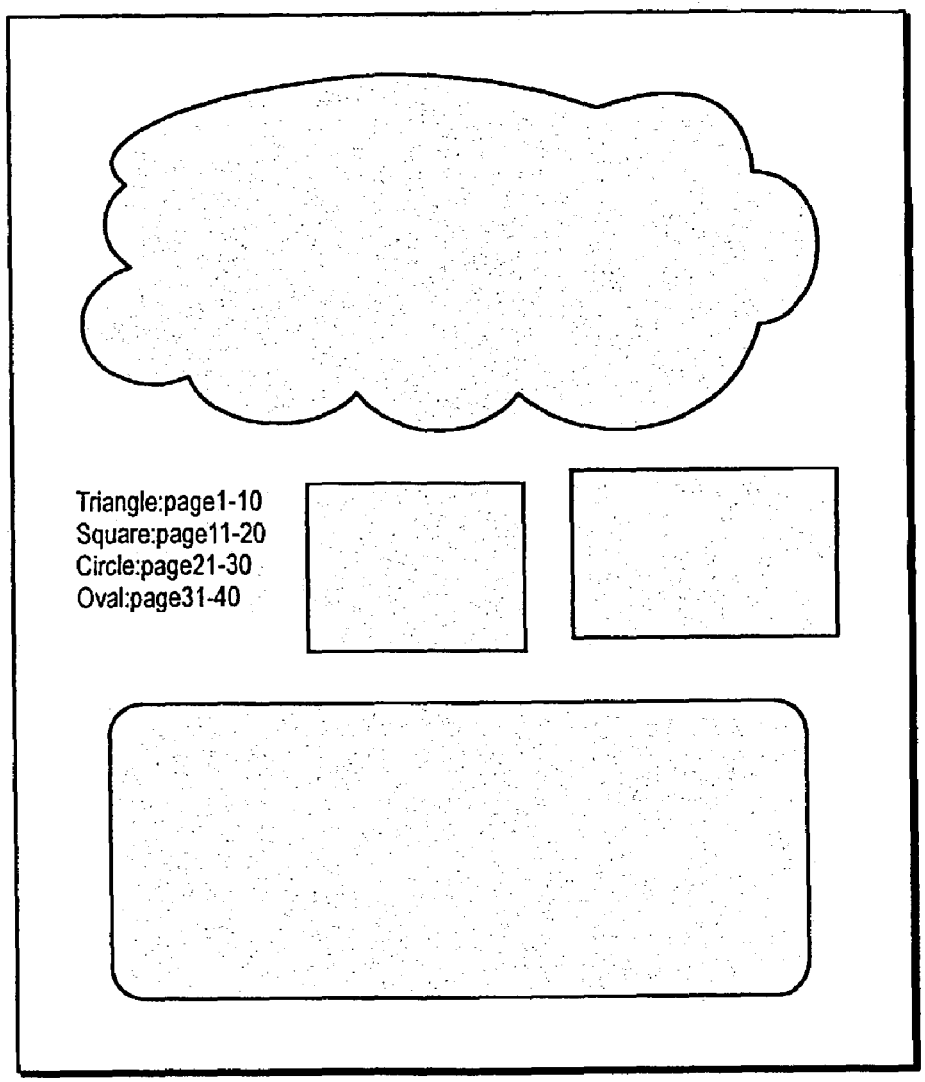
FIG. 15 is a diagram showing an image consisting of the edges of FIG. 14.

Thus, by detecting the contour line of the binary image obtained by binarization at the background level, the area division can be achieved in such a way as to combine multiple areas that are in contact with each other. In the first through fourth modes, four major areas and a character area are obtained as shown in FIG. 14 and FIG. 15. However, in the fifth and the sixth modes wherein character areas are prioritized, the extraction of the character areas are done ahead of the area division based on binarization, so that only the four big areas will be obtained.

First Photographic/Graphic Area Extraction

Figure 16:
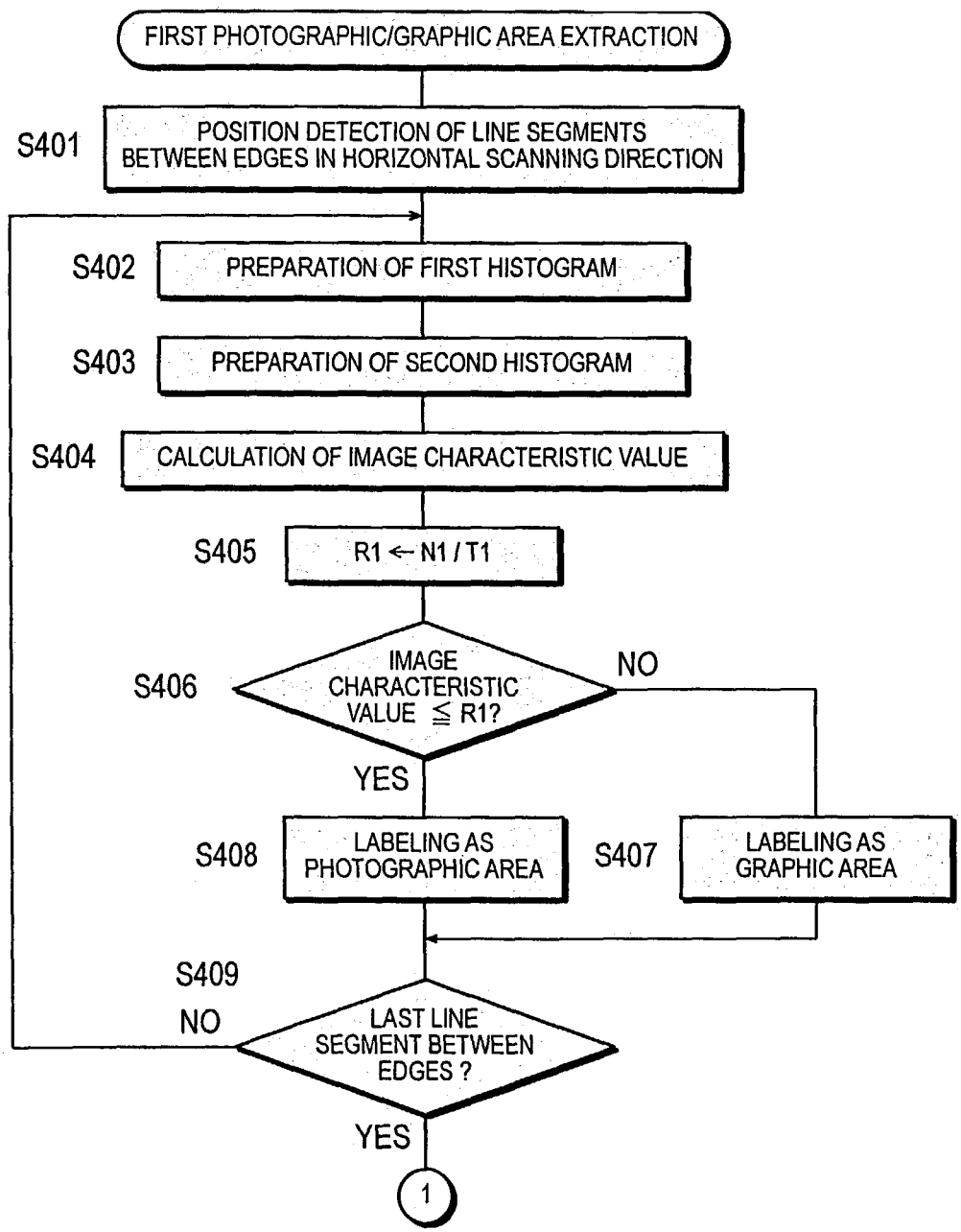
FIG. 16 is a flowchart showing the procedure of the first photographic/graphic area separation process.
Figure 17:
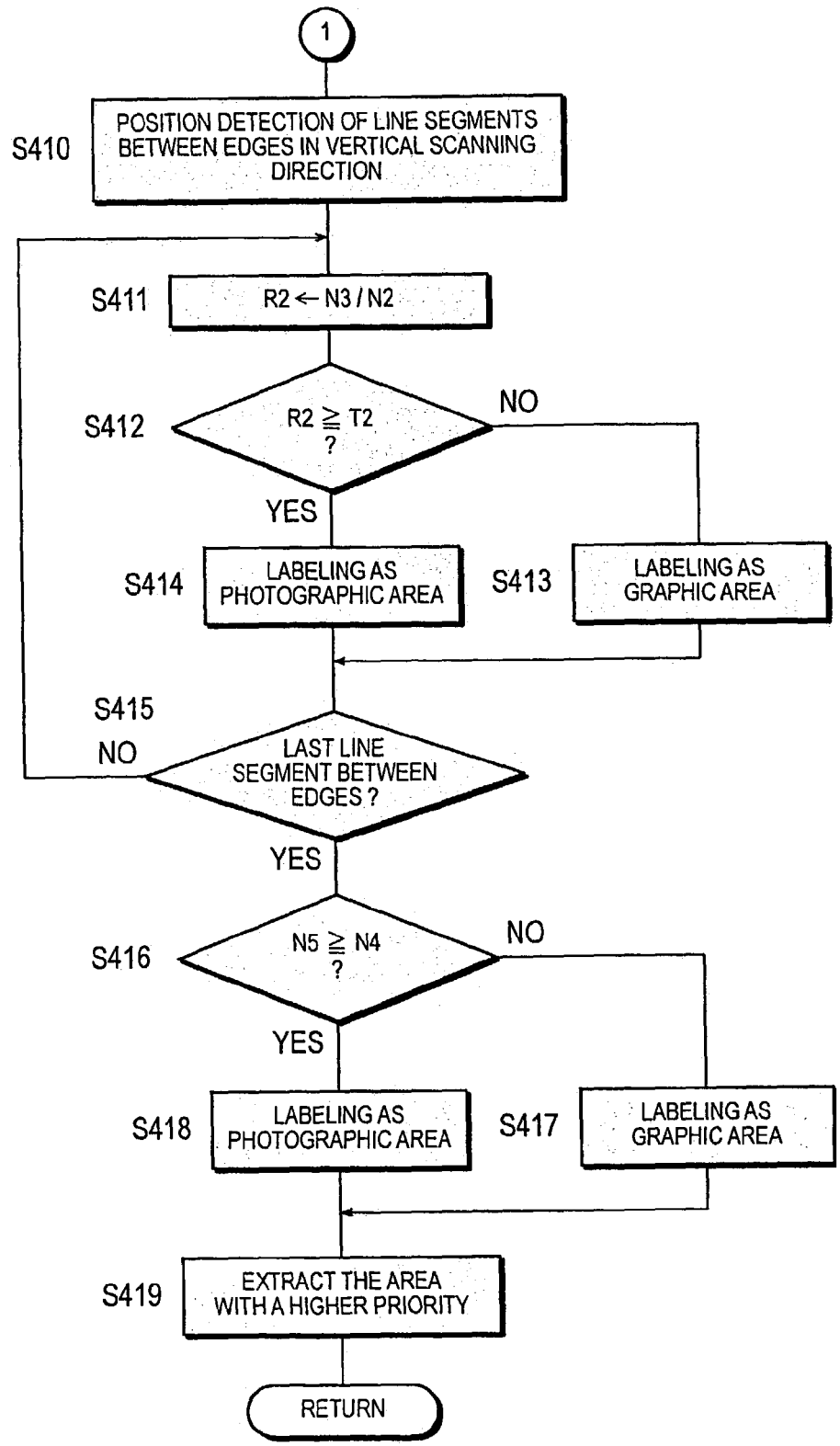
FIG. 17 is a flowchart continued from FIG. 16 showing the procedure of the first photographic/graphic area separation process.

Let us now describe the procedure of the first photographic/graphic area extraction with reference to FIG. 16 and FIG. 17.

Figure 18:
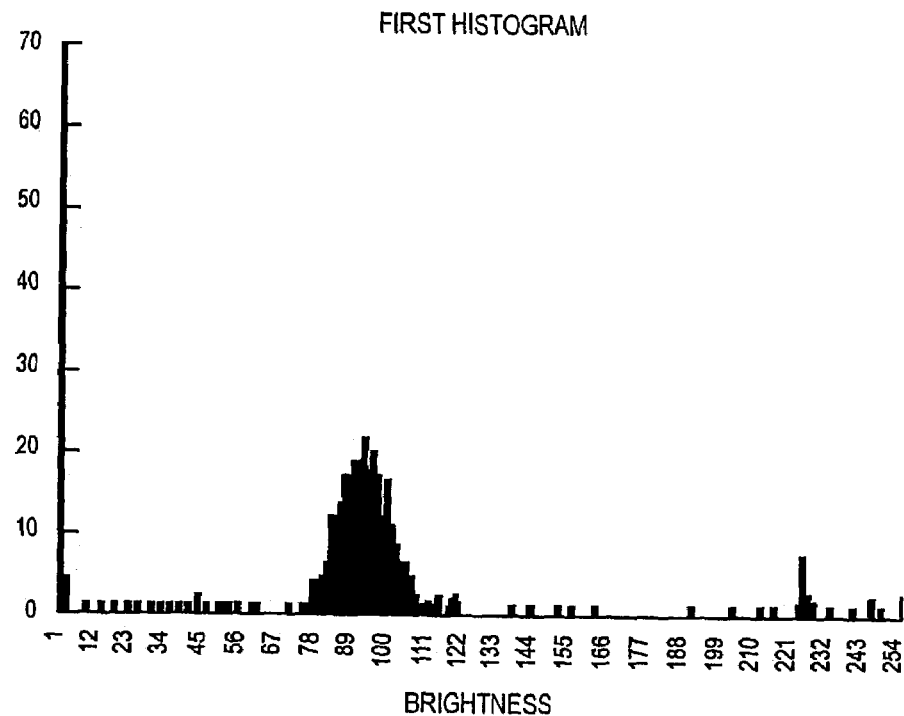
FIG. 18 is a diagram showing the first histogram.
Figure 19:
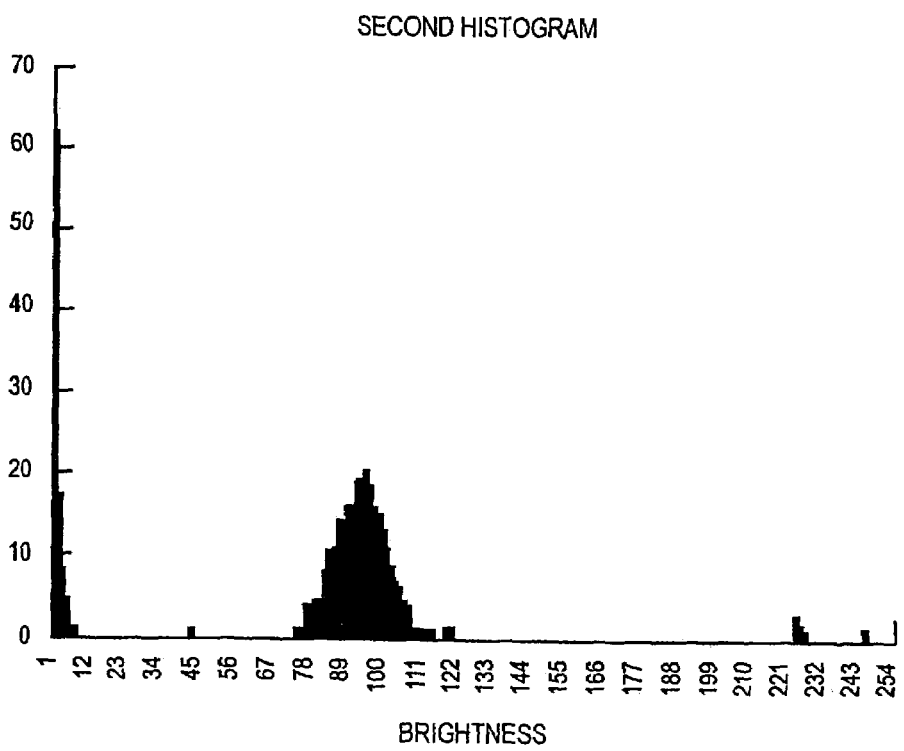
FIG. 19 is a diagram showing the second histogram.

The first photographic/graphic area extraction process is applied to each of the areas sectioned by the binary image contour lines obtained by binarization at the background level (areas surrounded by closed lines in FIG. 15). First, the positions of line segments between edges relative to the first direction, for example, the horizontal scanning direction, are detected based on the edge positions of edge images in FIG. 15 (step S401). The horizontal scanning direction means a main-scan direction. A histogram (the first histogram) such as the one shown in FIG. 18 is prepared using the pixels of the brightness image corresponding to the position of the line segment between edges in question (step S402). Applying a smoothing process using an average filter (|1|0|1|) to the first histogram produces the second histogram such as the one shown in FIG. 19 (step S403). Next, according to the following equation, the difference between the first histogram Hist1 and the second histogram Hist2 is calculated and its sum is registered as the characteristic value (step S404). Incidentally, the brightness is expressed in 8 bit data and has 256 gradations.

$$\text{Image characteristic value} = \sum_{i=0}^{255} |Hist\ 1[i] - Hist\ 2[i]|$$

Next, the ratio R1 (=N1/T1) between the total count N1 of pixels located on the line segment between edges in question and a specified constant T1 is calculated (step S405). The constant T1 is the first parameter for separating photographic areas from graphic areas. Next, the ratio R1, which is the threshold value, is compared with the characteristic value (step S406). If the characteristic value is judged to be greater than the ratio R1 (step S406: No), all the pixels located on the line segment between edges relative to the first direction will be considered to belong to the graphic area, and the labeling process, which is the process of assigning numbers, will be executed to generate the labeling data (step S407). Thus, the result of the area judgment for each pixel will be labeled. More specifically, the result of the area judgment is stored in correspondence with the pixel position. On the other hand, if the characteristic value is judged to be less than the ratio R1 (step S406: Yes), all the pixels located on the line segment between edges relative to the first direction will be considered to belong to the photographic area and the labeling data will be generated (step S408). Next, a judgment is made as to whether the line segment between edges in question is the last line segment between edges relative to the first direction (step S409). If the line segment between edges in question is judged not to be the last line segment between edges (step S409: No), the program returns to the step S402 to repeat the above process.

Next, based on the edge images of FIG. 15, the positions of the line segments between edges relative to the second direction perpendicular to the first direction, for example, the vertical scanning direction, are detected (step S410). The vertical scanning direction means a sub-scan direction. Based on the labeling data prepared in the steps S407 and S408, the ratio R2 (=N3/N2) between the total count N2 of pixels located on the line segment between edges in question and the number N3 of pixels belonging to the photographic area is calculated (step S411). Next, the ratio R2 is compared with a specified constant T2, which is the threshold value (step S412). The constant T2 is the second parameter for separating photographic areas from graphic areas. If the ratio R2 is judged to be smaller than the constant T2 (step S412: No), all the pixels existing on the line segment between edges in question relative to the second direction will be considered to belong to the graphic area, and will be relabeled (step S413). On the other hand, if the ratio R2 is judged to be greater than the constant T2 (step S412: Yes), all the pixels existing on the line segment between edges in question relative to the second direction will be considered to belong to the photographic area, and will be relabeled (step S414). Next, a judgment is made as to whether the line segment between edges in question is the last line segment between edges relative to the second direction (step S415). If the line segment between edges in question is judged not to be the last line segment between edges (step S415: No), the program returns to the step S411 to repeat the above process.

Next, the count N5 of the pixels that are labeled to be belonging to the photographic area within an area obtained by the area division based on binarization is compared with the count N4 of the pixels that are labeled to be belonging to the graphic area within the same area (step S416). If it is judged that N5<N4 (step S416: No), the area is judged to be the graphic area (step S417). If it is judged that N5≧N4 (step S416: Yes), the area is judged to be the photographic area (step S418). As the area judgment is confirmed for whichever with a higher priority of the photographic area and the graphic area, all the pixels within the area will be considered to belong to the area with the higher priority, relabeled, and extracted from the image data (step S419). At this point, the circumscribing rectangle is calculated by tracing the contour of the area based on the position data, and a rectangular area that contains pixels that are labeled to be belonging to the area as they correspond to coordinate positions within the circumscribing rectangle is extracted from the image data.

Thus, in the first photographic/graphic area extraction, a judgment is made for an area obtained by the area division based on binarization whether the area is a photographic area or a graphic area by means of calculating the image characteristic value between the edges that are the boundary of the area. If the photographic area has a higher priority than the graphic area (the first, second and fifth mode), the photographic area is confirmed and the area is extracted in a form of a rectangular area. On the other hand, if the graphic area has a higher priority than the photographic area (the third, fourth and sixth mode), the graphic area is confirmed and the area is extracted in a form of a rectangular area.

As can be seen from the above, according to this embodiment, an area is judged whether it is a photographic area or a graphic area based on the characteristic that the brightness distribution is relatively uniform in a graphic area, while the brightness distribution is distributed in a photographic area. However, the area judgment method is not limited to the above, but it is also possible to do it using the frequency component extracted from the brightness image as the characteristic value.

Area Division by Edges

Figure 20:
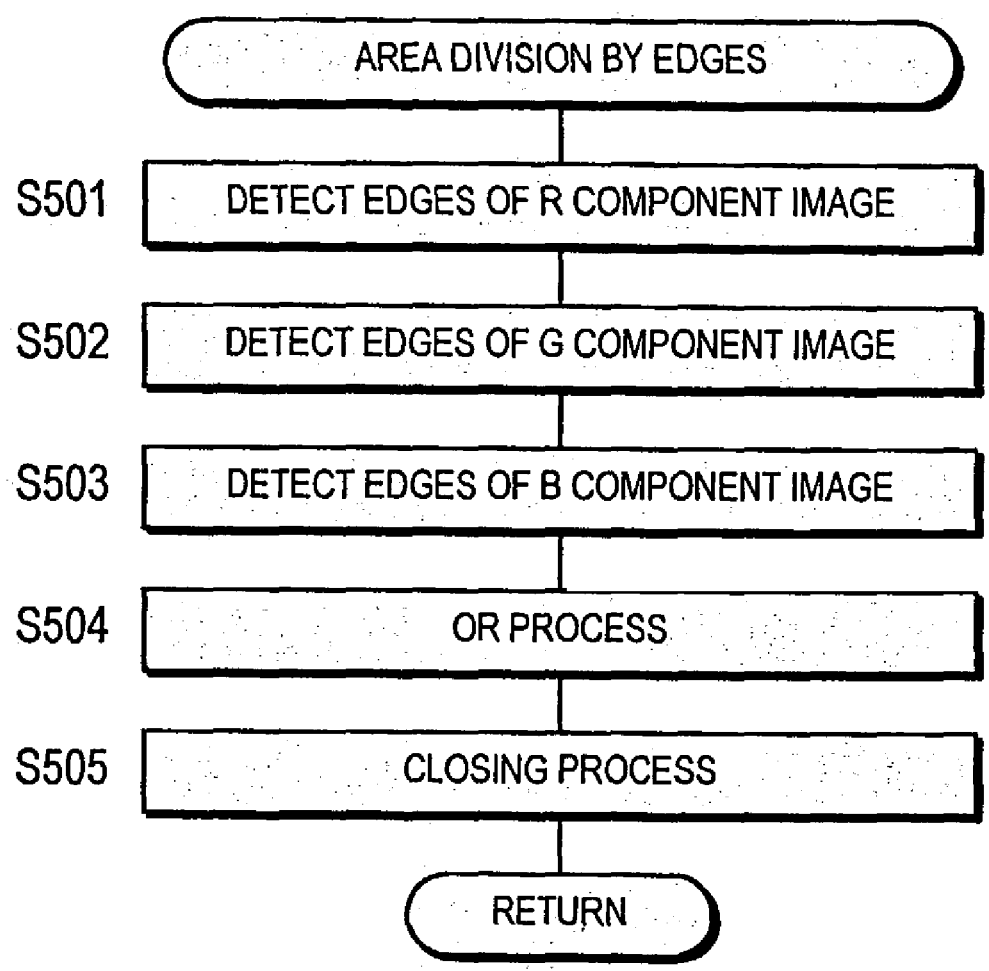
FIG. 20 is a flowchart showing the procedure of the area division process based on edges.

Next, let us describe the process of area division by edges with reference to FIG. 20.

The process of area division by edges is performed on the data remaining after whichever with a higher priority of the photographic and graphic areas has been extracted by means of the first photographic/graphic area extraction.

First, the edge detection is performed using an edge detection filter such as a Laplacian filter on each of an R component image, a G component image, and a B component image (steps S501, S502 and S503). Next, an OR process is performed in order to obtain the sum of sets of edges of the detected R component image, G component image, and B component image (step S504), and a closing process is performed in order to eliminate edge breaks (step S505). At this point, in the first through fourth modes, the edges of character image are also detected as the character area has not been extracted. However, if the size (vertical and horizontal dimensions) of the circumscribing rectangle of an area is smaller than the specified threshold value, and the ratio of the effective pixel counts for the size of the circumscribing rectangle is smaller than the specified threshold value, the area will be discarded from the objects of the area division by edges. Thus, the edges of a character image are not considered as the boundary of the area.

Figure 21A:
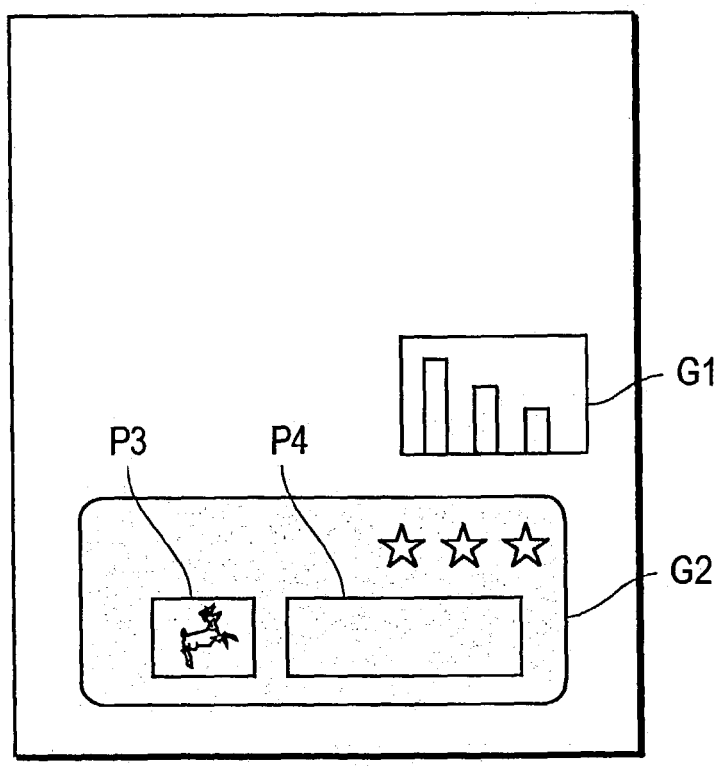
FIG. 21A is a schematic diagram showing an example area obtained by the area division process based on edges in case of the first, second or fifth mode.
Figure 21B:
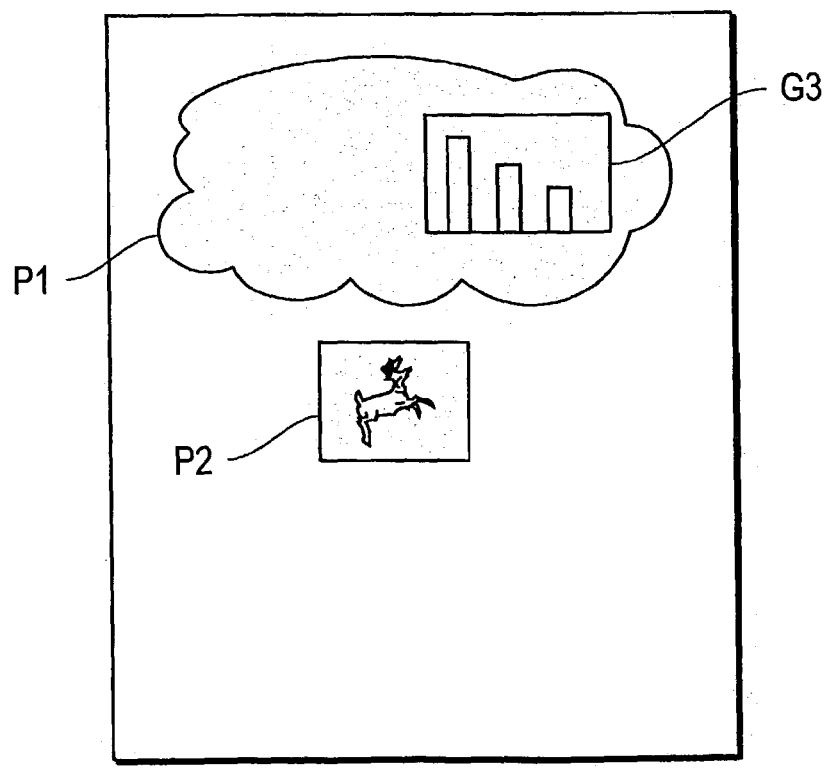
FIG. 21B is a model diagram showing an example area obtained by the area division process based on edges in case of the third, fourth or sixth mode.

FIG. 21A and FIG. 21B are the drawings schematically showing the examples of areas obtained according to the area division by edges, wherein FIG. 21A shows a case of the first, second, or fifth mode, and FIG. 21B shows a case of the third, fourth, or sixth mode. In FIG. 21A, the photographic areas are already extracted ahead of graphic areas by means of the first photographic/graphic area extraction. In other words, an area P1 (including an area G3) and an area P2 shown in FIG. 21B are already extracted as photographic areas in FIG. 21A. Also, in FIG. 21B, the graphic areas are already extracted ahead of photographic areas by means of the first photographic/graphic area extraction. In other words, an area G1 and an area G2 (including areas P3 and P4) shown in FIG. 21A are already extracted as graphic areas in FIG. 21B.

As can be seen from the above, the area division by edges is done for extracting areas with a higher priority when an area with a higher priority still exists overlapping an area with a lower priority, or an area with a higher priority exists inside an area with a lower priority, in the data remaining after whichever with a higher priority of the photographic area and the graphic area has been extracted by means of the first photographic/graphic area extraction. In other words, a finer area division process can be performed by detecting edges as described above.

Second Photographic/Graphic Area Extraction

Next, we will describe the second photographic/graphic area extraction procedure. The second photographic/graphic extraction process, which is identical to the first photographic/graphic extraction process, will be performed on the areas obtained by the area division by edges shown in FIG. 21. This will extract the photographic areas in the graphic areas, which were not extracted in the first photographic/graphic area extraction process, in case of the first, second, and fifth modes. For example, in FIG. 21A, the areas P3 and P4 are extracted as photographic areas additionally. Also, this will extract the graphic areas in the photographic areas, which were not extracted in the first photographic/graphic area extraction process, in case of the third, fourth, and sixth modes. For example, in FIG. 21B, the area G3 will be extracted as a graphic area additionally.

Moreover, in the photographic/graphic area extraction performed after the second photographic/graphic area extraction shown in FIG. 7 through FIG. 12, the areas left unextracted in the second photographic/graphic area extraction process will be extracted among the areas obtained by the area division by edges shown in FIG. 21.

Character Area Extraction

Figure 22:
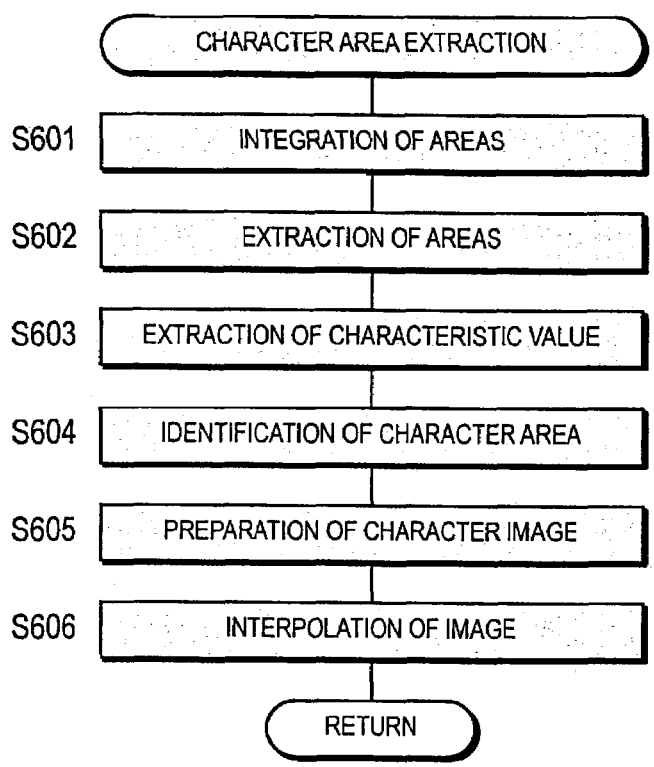
FIG. 22 is a flowchart showing the procedure of the character area extraction process.

Next, let us describe the character area extraction process with reference to FIG. 22.

Figure 23:
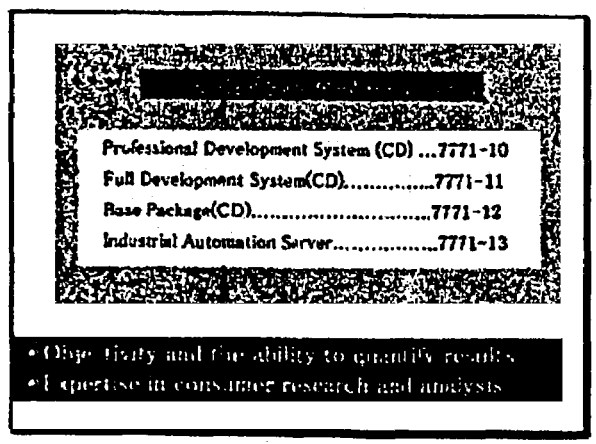
FIG. 23 is a diagram showing image data used for describing the character area extraction.

In order to simplify the description, let us describe, as an example, a case where the character area extraction is performed on the image data shown in FIG. 23.

Figure 24:
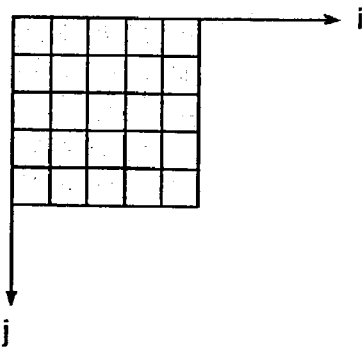
FIG. 24 is a diagram for describing a binarization process based on variable threshold values.

First, the area integration process is applied to the image data (step S601). This process is to extract, for example, a character image on the background image, or a character area containing character images with different pixel values. Specifically, after applying the smoothing process to brightness images in the image data, an edge image is generated by binarizing them using a variable threshold value. The binarization process using a variable threshold value means, for example, as shown in FIG. 24, is a process of binarizing a pixel in question using the value obtained by subtracting an offset value from the maximum gradation value of the pixels on four corners of a 5×5 block as the threshold value.

Next, measure the distances between black pixels in the horizontal scanning direction of the edge image thus obtained, and replace all white pixels between two black pixels distanced by less than a specified distance with black pixels to connect them with black pixels in order to obtain a connected edge image. Further, a similar process is repeated in the vertical scanning direction of the thus obtained connected edge image to obtain a connected edge image, connecting black pixels both in the horizontal and vertical scanning direction. Consequently, the image processing device 1 is capable of connecting adjacent black pixels, integrating individual character images isolated in the image data into one area, so that each string of characters can be extracted as a single area.

Figure 25:
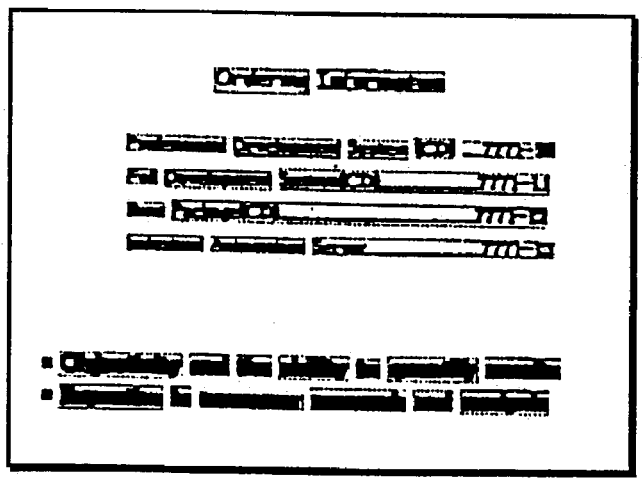
FIG. 25 is a diagram showing a connected edge image obtained by applying the binarization process based on variable threshold values and the black pixel connection process, and circumscribing rectangles obtained for groups of black pixels each having a common label in a labeling image obtained from the connected edge image data.

Next, an area extraction process is executed (step S602). This process is a process of extracting a group of connected black pixels as an area. More specifically, it labels the obtained connection edge image by each group of connected pixels. Simultaneous with the labeling, the position information (width, height, and coordinate) of the circumscribing rectangle for each group of connected pixels having the same label is detected and the a labeling image is produced. Next, an area surrounded by the circumscribing rectangle is extracted from the labeling image as a local area based on the label number and the circumscribing rectangle detected at the time of labeling. Here it becomes possible to extract also the layout images whose circumscribing rectangle are overlapping with each other by extracting the circumscribing rectangles containing the pixels of the same label number. FIG. 25 is a diagram indicating a connected edge image obtained by applying the binarization process based on variable threshold values and the black pixel connection process, and circumscribing rectangles obtained for groups of black pixels each having a common label in a labeling image obtained from the connected edge image data.

Figure 26:
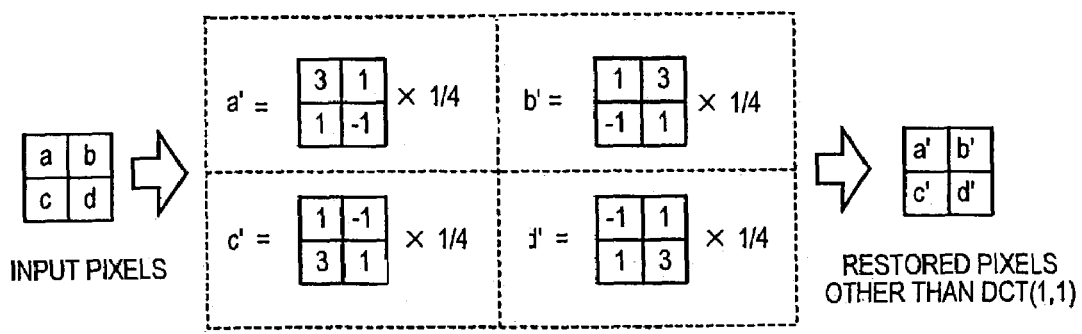
FIG. 26 is a diagram for describing the filtering process used for removing high frequency components from characteristic frequency components of image data.
Figure 27:
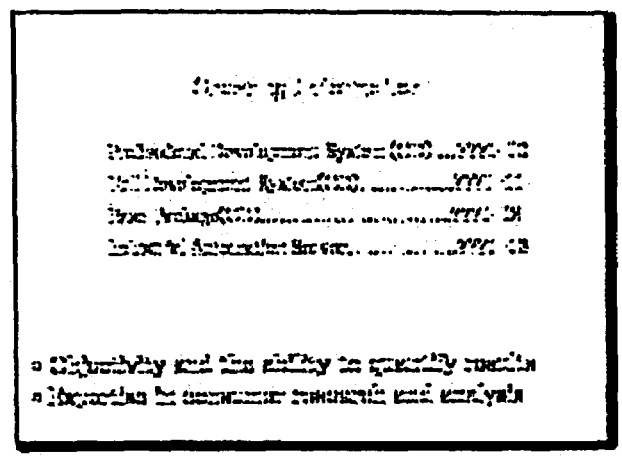
FIG. 27 is a diagram showing an example diagonal direction edge component image obtained by binarizing the extracted high frequency components.

Next, the diagonal edge components that belong to each local area extracted in the step S602 are extracted as the characteristic values (S603), and a local area with a content of diagonal direction edge components that falls within a certain range is identified as a character area (S604). A character area contains more diagonal edge components in a restricted area compared to other areas such as graphics, photographs, and ruled lines. Therefore, by extracting the diagonal edge components as the frequency components, which are characteristic to a character area, and determining the contents in a local area, it is possible to make a judgment whether the local area is a character area. The extraction of such diagonal edge components is identical to the process of extracting high frequency components among the frequency components obtained by 2×2 DCT (discrete cosine transformation). In other words, a restored image free of high frequency components can be obtained by applying DCT based on a 2×2 matrix to an image within a local area and conducting a reverse DCT transformation by setting "zero" to the high frequency components of the obtained frequency components. Next, only the high frequency components of the original image are extracted by means of detecting the differences between the original image and the restored image. Here a high speed processing is possible by applying a filtering process shown in FIG. 26. FIG. 27 is a diagram indicating an example of diagonal direction edge component image obtained by binarizing the extracted high frequency components. The local area normally consists of a singe word. Therefore, when a local area is a character area, the content of the diagonal edge components within the local area, i.e., the ratio of the total number of black pixels within the local area in FIG. 27 relative to the total area of the local area falls within a specified range (approximately 0.2%–20%). Thus, a local area whose ratio is within the range is identified as a character area.

Figure 28B:
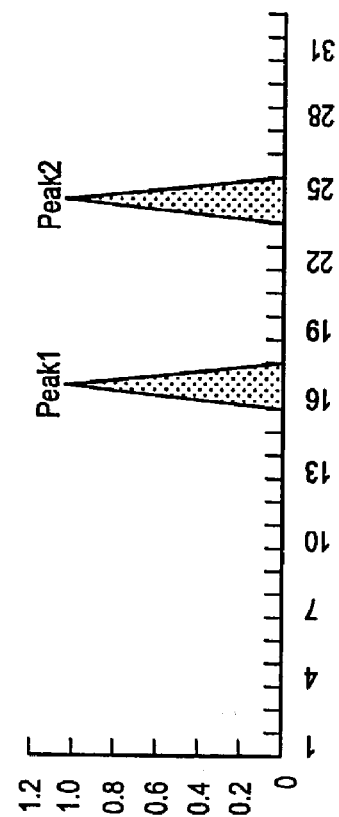
FIG. 28B is a diagram showing a peak detecting histogram prepared from a brightness image of the image data in a character area.
Figure 28A:
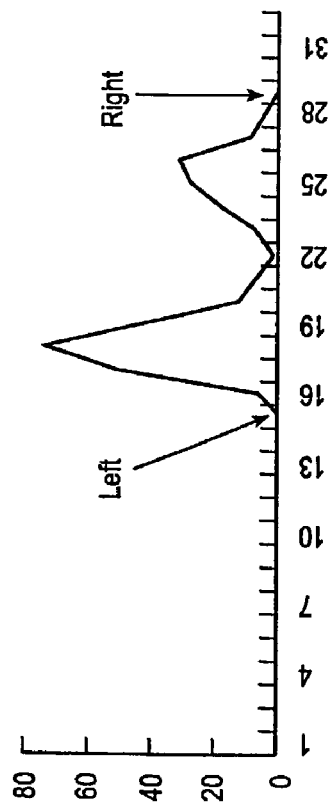
FIG. 28A is a diagram showing an example brightness histogram prepared from a brightness image of the image data in a character area.

Next, a character image forming process is executed (step S605). A character image consisting only of character parts is formed by separating character parts and their backgrounds by binarizing the original image data (image data received from the scanner 2) within a local area identified as a character area in the step S604. The threshold value used in the binarization is set up for each character area. The following method, for example, can be used as a method of setting up the threshold value. First, a brightness histogram such as the one shown in FIG. 28A is prepared for each area using a brightness image of image data within the character area. Next, convert the brightness histogram into percentages for the pixels within the character area, apply a differentiation of the second order, and form a histogram as shown in FIG. 28B by outputting "1" if the result of the second differentiation is higher than the specified value, or "0," otherwise, in order to detect the peak. The threshold value is determined as the median value of the peaks on both ends, i.e., the median of the peaks on both ends when the number of peaks is greater than 2; the average value of the left and right rising values ("Left" and "Right" values in FIG. 28A) of the brightness value histogram if the number of peaks is 1; or the median of the left and right rising values, if the number of peaks is zero. Using such a binarizing threshold value that varies with the number of peaks on a brightness histogram within a character area, it becomes possible to binarize without missing any part of the image even in case of a character image on a background image, a reversed character image, etc.

Next, an image interpolation process is executed (step S606). In other words, images consisting only of character parts are removed from the original image data, and the portions remaining after the removal will be interpolated by the character images' background pixels. Here the background pixels of the character images can be identified from the image obtained by binarizing for each character area in the step S605. The values of the background pixels used for the interpolation can be obtained by calculating an average for R, G and B respectively from the pixels that correspond to the character image background in the original RGB image data.

Thus, the image processing device 1 combines adjacent areas by connecting neighboring black pixels, extracts the combined areas, calculates the characteristic value that represents characters, identify whether each extracted area is a character area using this characteristic value, and then forms a character image consisting solely of character parts from image data in the area identified as a character area. Next, the portions remaining after the removal of the character image solely consisting of character parts will be interpolated by the background pixels.

In this characters area extraction, character areas can be securely extracted even when the character images are overlapping photographic or graphic images. However, if a document mode is set up in such a way that photographic or graphic areas are prioritized over character areas, character images overlapping photographic images or graphic images will be extracted firstly as a part of the photographic or graphic images.

As can be seen from the above, the photographic areas, graphic areas and character areas will be separated from the image data received via the scanner in the area extraction order corresponding to the document mode set up as shown in FIG. 7 through FIG. 12.

According to the present embodiment, it is possible to set up the order of extraction of each area when separating photographic, graphic and character areas from the image data, so that it is possible to control the area to be extracted firstly. Therefore, even if an area with high priority encloses other types of areas, it will be extracted preferentially with the other types of areas located in it. And even if an area with high priority is located in other types of areas, it will be extracted preferentially. Thus, an area with high priority is prevented from getting extracted, mistaken for another area, as it is extracted ahead of other areas, and prevented from its image getting deteriorated due to improper processes mistakenly applied on it.

Figure 30C:
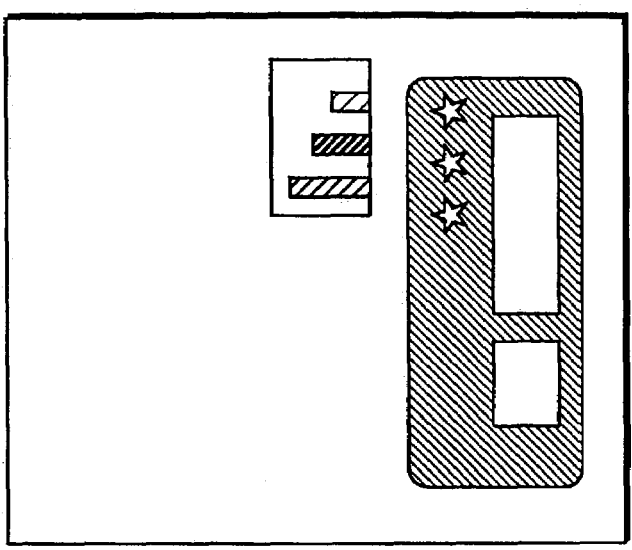
FIG. 30C is a diagram showing the graphic areas extracted thirdly from the image data of FIG. 5 in the area separation process of the second mode.
Figure 30B:
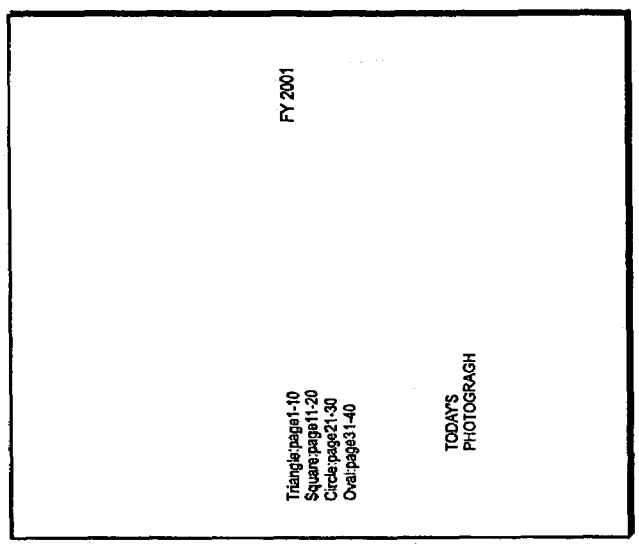
FIG. 30B is a diagram showing the character areas extracted secondly from the image data of FIG. 5 in the area separation process of the second mode.
Figure 30A:
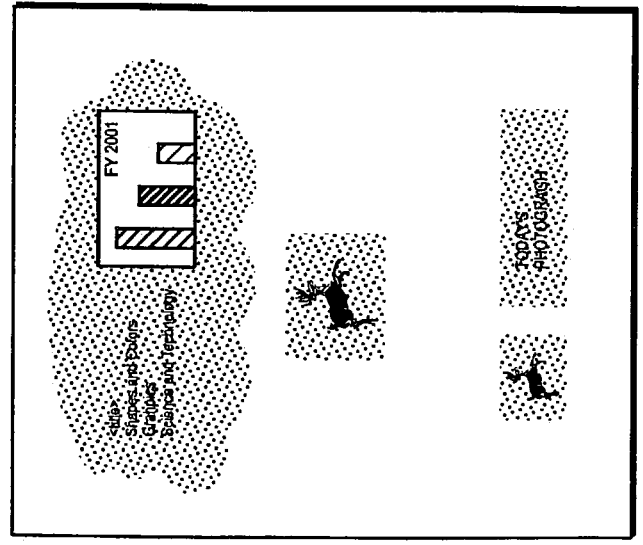
FIG. 30A is a diagram showing the photographic areas extracted firstly from the image data of FIG. 5 in the area separation process of the second mode.

FIGS. 29A, 29B, 29C, . . . 34A, 34B, and 34C are the photographic, graphic, and character areas separated from the image data shown in FIG. 5 by the area separation processes of the first through sixth modes. FIGS. 29A, 30A, . . . 34A are the areas extracted firstly, FIGS. 29B, 30B, . . . 34B are the areas extracted second, and FIGS. 29C, 30C, . . . 34C are the areas extracted third.

If the first priority areas are photographic areas (the first and second modes), graphic and character areas will be separated from the remaining data after the photographic areas are extracted firstly from the received image data as shown in FIG. 29A and FIG. 30A, so that the photographic areas will be prevented from being extracted accompanying other areas under the influence of the separation processes for other areas. This allows the photographic areas to be securely extracted without being confused with the other areas. Consequently, when the high quality reproduction of the photographic areas is the main object, it makes it possible to extract more photographic areas surely and execute an appropriate process to the areas. In other words, it can prevent a part of a photographic area, for example, from being misidentified to be a character area and binarized suitable for a character area in the later process. Also, it prevents a portion of a part in a photographic area, for example, from being misidentified to be a graphic area and painted with a solid single color as a result of color reduction process suitable for a graphic area in the latter process. In other words, it prevents a photographic area from being applied with an inappropriate process to be deteriorated. Also, it provides a benefit of maintaining the contents of the original image data by extracting photographic areas with priority. In other words, even if a graphic area or a character area is misjudged as a photographic area, it allows it to be reproduced as an image so that the contents of the area can be maintained.

Furthermore, in extracting graphic areas ahead of character areas from image data after extracting photographic areas (the first mode), it prevents a part of a graphic area from being misjudged as a character area and be applied a process suitable for character areas in the later process. Therefore, it minimizes the deterioration of photographic and graphic images. Also, it is possible to extract character images within a graphic area in case of extracting character areas ahead of graphic areas after extracting photographic areas (the second mode). Therefore, it minimizes the deterioration of photographic and character images.

Figure 31C:
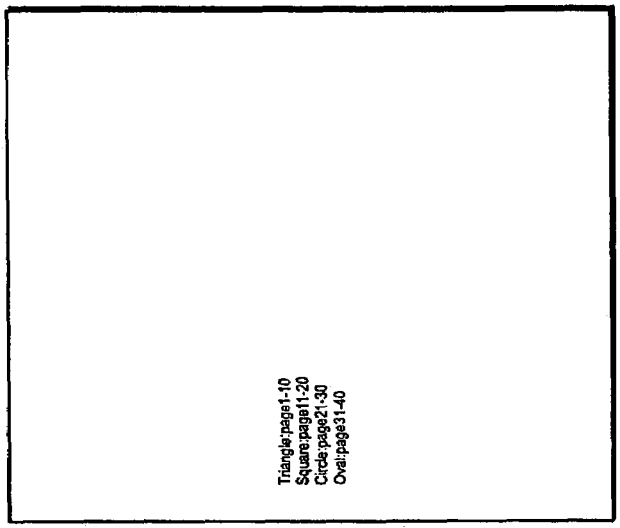
FIG. 31C is a diagram showing the character areas extracted thirdly from the image data of FIG. 5 in the area separation process of the third mode.
Figure 31B:
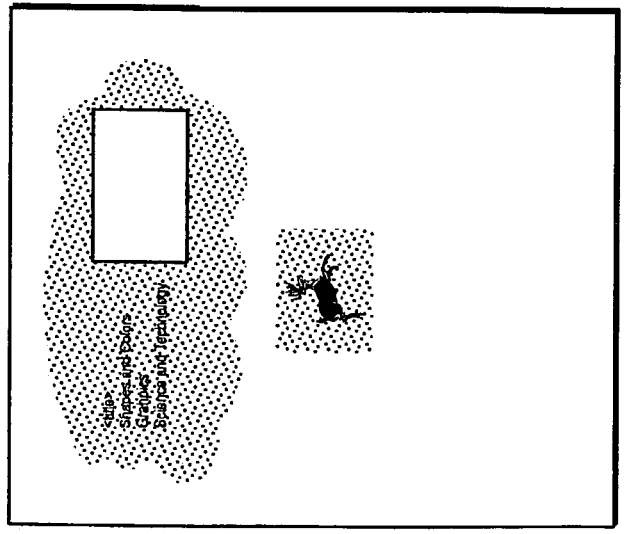
FIG. 31B is a diagram showing the photographic areas extracted secondly from the image data of FIG. 5 in the area separation process of the third mode.
Figure 31A:
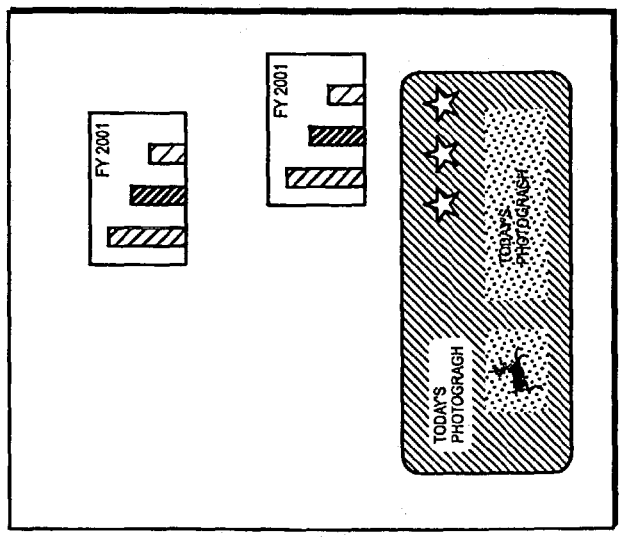
FIG. 31A is a diagram showing the graphic areas extracted firstly from the image data of FIG. 5 in the area separation process of the third mode.
Figure 32C:
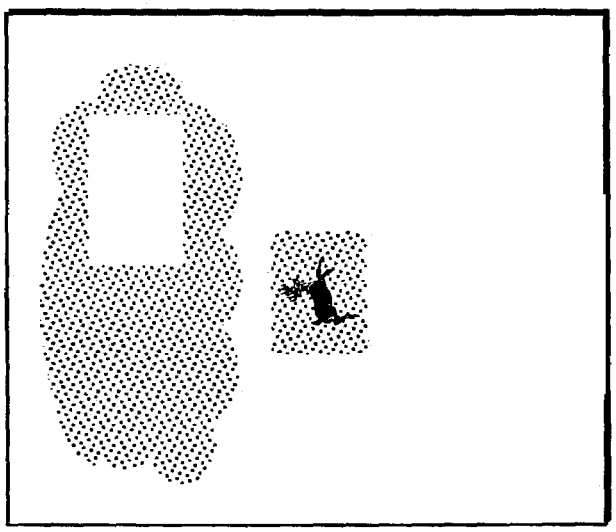
FIG. 32C is a diagram showing the photographic areas extracted thirdly from the image data of FIG. 5 in the area separation process of the fourth mode.
Figure 32B:
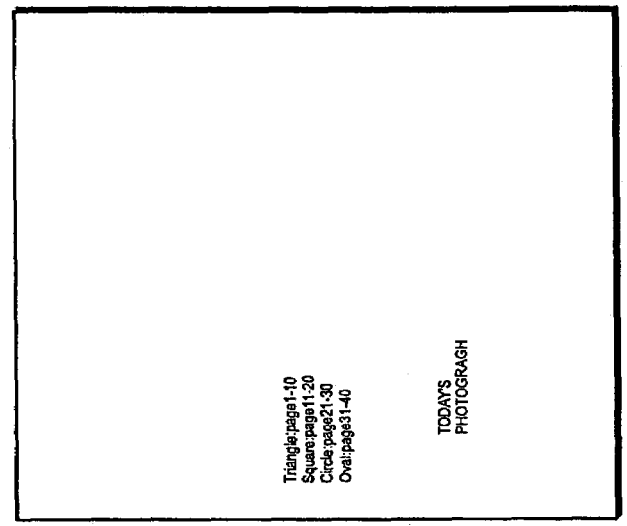
FIG. 32B is a diagram showing the character areas extracted secondly from the image data of FIG. 5 in the area separation process of the fourth mode.
Figure 32A:
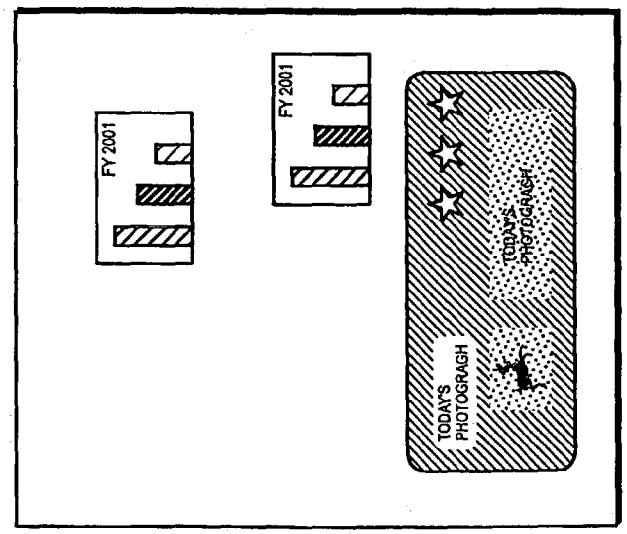
FIG. 32A is a diagram showing the graphic areas extracted firstly from the image data of FIG. 5 in the area separation process of the fourth mode.

If the first priority areas are graphic areas (the third and fourth modes), photographic and character areas will be separated from the remaining data after the graphic areas are extracted firstly from the received image data as shown in FIG. 31A and FIG. 32A, so that the graphic areas will be prevented from being extracted accompanying other areas under the influence of the separation processes for other areas. This allows the graphic areas to be securely extracted without being confused with the other areas. Consequently, when the application of processes appropriate to the graphic areas such as the vector transformation is the main object, it makes it possible to extract more graphic areas surely and execute an appropriate process to the areas. In other words, if a graphic area is overlapping a photographic area, it can prevent the entire area from being misidentified as a photographic area to be applied a JPEG compression, hence creating noises. Also, it can prevent an area containing a graphic image which can be easily misjudged as a character image from being misidentified as a character area, being applied with a binarization process suitable for character areas, and further being applied with a character recognition process. In other words, it prevents a graphic area from being applied with an inappropriate process to be deteriorated.

Furthermore, in extracting photographic areas ahead of character areas from image data after extracting graphic areas (the third mode), it prevents a part of a photographic area from being misjudged as a character area and be applied a process suitable for character areas in the later process. Therefore, it minimizes the deterioration of graphic and photographic images. Also, it is possible to extract character images within a photographic area in case of extracting character areas ahead of photographic areas after extracting graphic areas (the fourth mode). Therefore, it can apply an irreversible compression process to a photographic image without deteriorating graphic and character images.

Figure 33C:
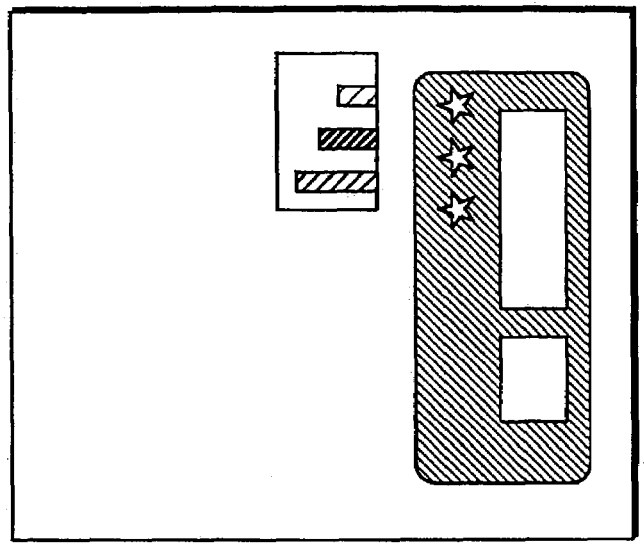
FIG. 33C is a diagram showing the graphic areas extracted thirdly from the image data of FIG. 5 in the area separation process of the fifth mode.
Figure 33B:
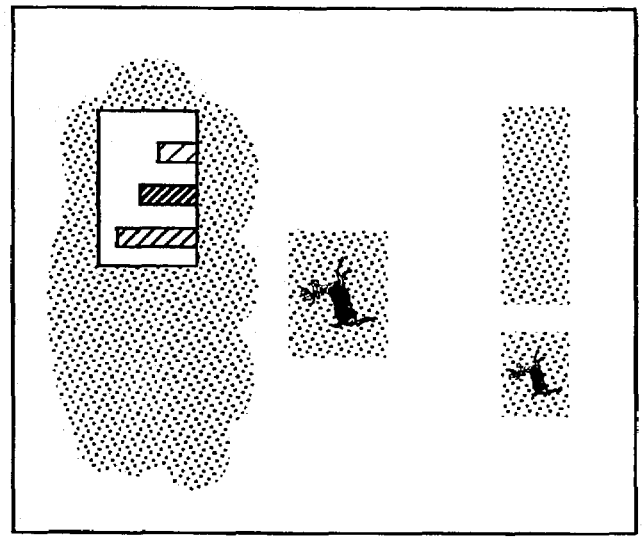
FIG. 33B is a diagram showing the photographic areas extracted secondly from the image data of FIG. 5 in the area separation process of the fifth mode.
Figure 33A:
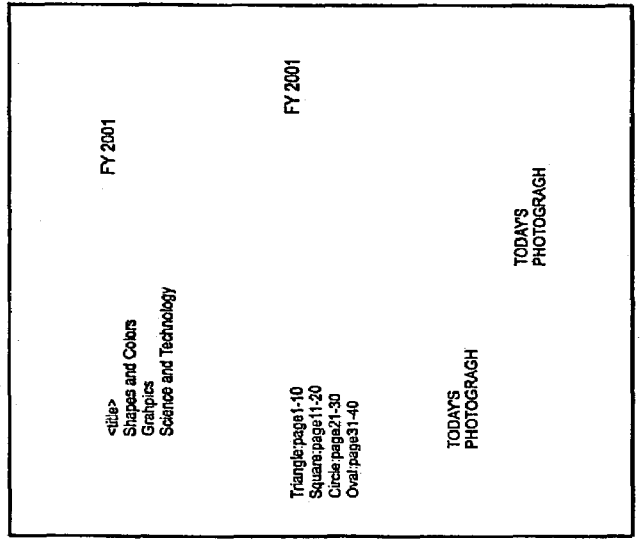
FIG. 33A is a diagram showing the character areas extracted firstly from the image data of FIG. 5 in the area separation process of the fifth mode.
Figure 34C:
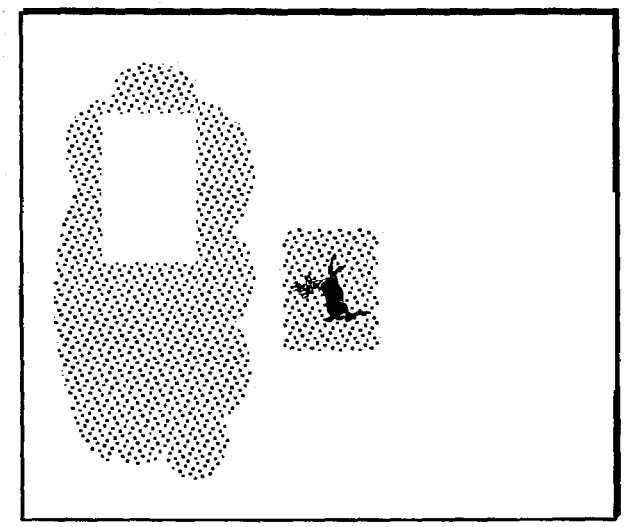
FIG. 34C is a diagram showing the photographic areas extracted thirdly from the image data of FIG. 5 in the area separation process of the sixth mode.
Figure 34B:
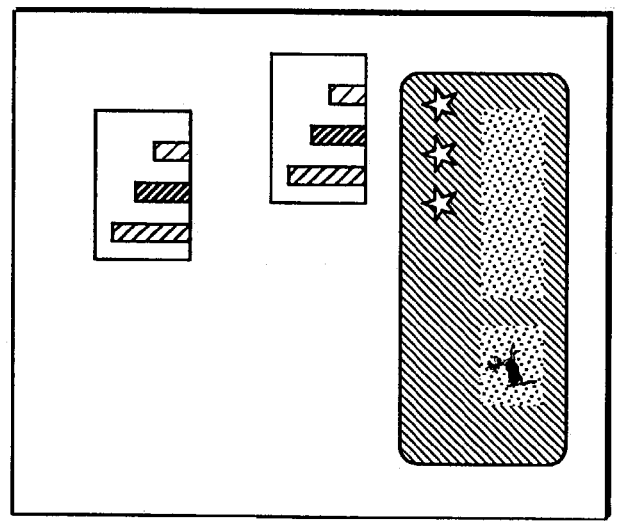
FIG. 34B is a diagram showing the graphic areas extracted secondly from the image data of FIG. 5 in the area separation process of the sixth mode.
Figure 34A:
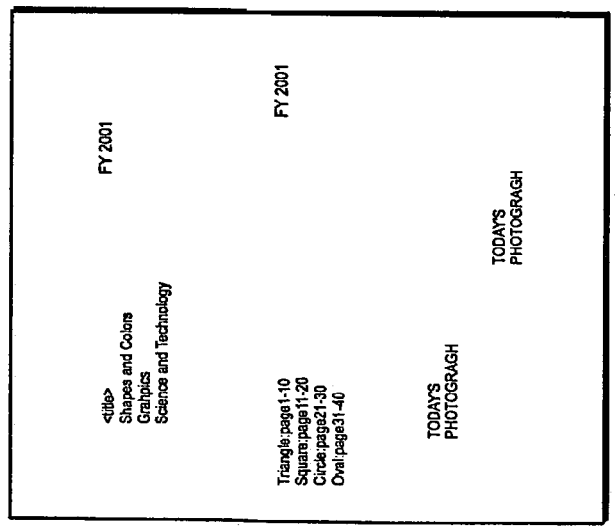
FIG. 34A is a diagram showing the character areas extracted firstly from the image data of FIG. 5 in the area separation process of the sixth mode.

If the first priority areas are character areas (the fifth and sixth modes), photographic and graphic areas will be separated from the remaining data after the character areas are extracted firstly from the received image data as shown in FIG. 33A and FIG. 34A, so that the character areas will be prevented from being extracted accompanying other areas under the influence of the separation processes for other areas. This allows the character areas to be securely extracted without being confused with the other areas. Consequently, when the application of processes appropriate to the character areas such as the character recognition process is the main object, it makes it possible to extract more character areas surely and execute an appropriate process to the areas. In other words, if a character image is overlapping a photographic or graphic image in image data, it can not only prevent the entire area from being misidentified as a photographic or graphic area without having the character area being identified, but also prevent the character image from being applied an inappropriate process being applied.

Also, it is possible to extract photographic images within a graphic area in case of extracting photographic areas ahead of graphic areas after extracting character areas from the image data (the fifth mode). Therefore, it minimizes the deterioration of character and photographic images. Also, it is possible to extract graphic images within a photographic area in case of extracting graphic areas ahead of photographic areas after extracting character areas from the image data (the sixth mode). Therefore, it can apply an irreversible compression process to a photographic image without deteriorating character and graphic images.

It is obvious that this invention is not limited to the particular embodiments shown and described above but may be variously changed and modified without departing from the technical concept of this invention.

The image processing device according to this invention can be applied, in addition to the mode indicated by the above embodiment, to equipment such as scanner, PC, workstation, server, digital copying machine, facsimile device, and MFP (multi-function peripherals).

Also, although it was indicated in the above embodiment that the file server 3 develops character images and graphic images from a file received from the image processing device 1, and applies the character recognition process and the vector transformation process respectively, but these processes can be performed by the image processing device 1. Moreover, the contents of each processing block in the area separating process shown in FIG. 7 through FIG. 12 can be arbitrarily modified.

Furthermore, although it was shown in the above embodiment that the image processing device 1 establishes a type of areas to be extracted with priority among photographic, graphic and character areas according to the contents of the image data, the invention is not limited to such a constitution. The image processing device according to this invention may have a pre-established type of areas to be extracted firstly; for example, graphic areas can be pre-selected to be extracted firstly. Further, the image processing device according to this invention can have a prefixed order of area extraction; for example, it can be fixed in the order of graphic areas, photographic areas and character areas, or in the order of graphic, character and photographic areas.

The image processing device and the method of image processing according to this invention can be realized by a dedicated hardware circuit for executing the above-mentioned steps, or by causing a CPU to execute a program where the steps are described. In case of realizing this invention by causing a CPU to execute a program, the program for operating the image processing device can be provided by a computer readable recording medium such as a flexible disk or a CD-ROM, or can be provided on line by means of a network such as the Internet. In such a case, the program stored on a computer readable recording medium is normally transferred onto the hard disk to be stored therein. The program can also be provided as independent application software or can be built into the software of the image processing device as a part of its function.

What is claimed is:

1. An image processing device comprising:
    first setup means for setting up a graphic area to be extracted ahead of photographic and character areas from image data to be processed;
    second setup means for setting up the photographic area to be extracted ahead of the graphic and character areas from image data to be processed;
    third setup means for setting up the character area to be extracted ahead of the photographic and graphic areas from image data to be processed;
    selecting means for selecting at least one from said first setup means, second setup means, and third setup means; and
    area separating means for extracting firstly the area set up by the selected one of said first setup means, second setup means and third setup means from said image data, and then extracting the remaining two areas.

2. An image processing device as claimed in claim 1, further comprising:
    fourth setup means for setting up an area to be extracted secondly among said photographic, graphic and character areas from said image data, wherein
    said area separating means extracts secondly the area set up by said fourth setup means among the remaining two areas from the data remaining after extracting the area set up by the selected one of said first setup means, second setup means, and third setup means from said image data.

3. An image processing device as claimed in claim 1, further comprising:
    an image reader for obtaining image data by reading a document, wherein said image data to be processed is obtained by said image reader.

4. An image processing method comprising the steps of:
    1) selecting at least one of a first setting step, a second setting step, and a third setting step; wherein the first setting step is for setting up a graphic area to be extracted ahead of photographic and character areas from image data to be processed, the second setting step is for setting up the photographic area to be extracted ahead of the graphic and character areas from image data to be processed, and the third setting step is for setting up the character area to be extracted ahead of the photographic and graphic areas from image data to be processed;
    2) extracting the area set up in the step selected by step 1) from said image data; and
    3) extracting the remaining two areas from the data remaining after the extracting of step 2) from said image data.

5. A computer readable recording medium storing a computer program for performing the steps of:
    1) selecting at least one of a first setting step, a second setting step, and a third setting step; wherein the first setting step is for setting up a graphic area to be extracted ahead of photographic and character areas from image data to be processed, the second setting step is for setting up the photographic area to be extracted ahead of the graphic and character areas from image data to be processed, and the third setting step is for setting up the character area to be extracted ahead of the photographic and graphic areas from image data to be processed;
    2) extracting the area set up in the step selected by step 1) from said image data; and
    3) extracting the remaining two areas from the data remaining after the extracting of step 2) from said image data.

6. An image processing device comprising:
    first extracting means for extracting a first graphic area ahead of photographic and character areas from image data to be processed; and
    second extracting means for extracting the photographic and character areas from the data remaining after extracting the first graphic area from said image data;
    wherein said first extracting means executes:
    a first graphic area extraction process for dividing said image data into multiple specific areas and extracting the first graphic area among the divided areas; and
    a second graphic area extraction process for dividing the data remaining after extracting the first graphic area from said image data by said first graphic area extraction process into multiple areas that are smaller than said specific areas, and extracting a second graphic area among the divided areas.

7. An image processing device as claimed in claim 6, wherein
said second extracting means extracts the photographic area ahead of the character area from the data remaining after extracting the second graphic area from said image data.

8. An image processing device as claimed in claim 6, wherein
said second extracting means extracts the character area ahead of the photographic area from the data remaining after extracting the second graphic area from said image data.

9. An image processing device as claimed in claim 6, wherein
said first graphic area extraction process detects an edge of binary image that separates the photographic, first graphic and character areas from a background area in said image data, and divides said image data into said multiple specific areas using the detected edge; and
said second graphic area extraction process detects an edge of the data remaining after extracting the first graphic area from said image data by means of said first graphic area extraction process, and divides said data into multiple areas that are smaller than said specific areas using the detected edge.

10. An image processing device as claimed in claim 6, further comprising;
an image reader for obtaining image data by reading a document, wherein
said image data to be processed is obtained by said image reader.

11. An image processing method comprising the steps of:
dividing image data to be processed into multiple specific areas and extracting a first graphic area among the divided areas;
dividing the data remaining after extracting the first graphic area from said image data by said step of extracting the first graphic area into multiple areas that are smaller than said specific areas, and extracting a second graphic area among the divided areas; and
extracting the photographic and character areas from the data remaining after extracting the second graphic area from said image data.

12. A computer readable recording medium storing a computer program for performing the steps of:
dividing image data to be processed into multiple specific areas and extracting a first graphic area among the divided areas;
dividing the data remaining after extracting the first graphic area from said image data by said step of extracting the graphic area into multiple areas that are smaller than said specific areas, and extracting a second graphic area among the divided areas; and
extracting the photographic and character areas from the data remaining after extracting the second graphic area from said image data.

13. An image processing device comprising:
first extracting means for extracting a photographic area ahead of graphic and character areas from image data to be processed; and
second extracting means for extracting the graphic and character areas from the data remaining after extracting the photographic area from said image data;
wherein said first extracting means executes:
a first photographic area extraction process for dividing said image data into multiple specific areas and extracting a first photographic area among the divided areas; and
a second photographic area extraction process for dividing the data remaining after extracting the first photographic area from said image data by said first photographic area extraction process into multiple areas that are smaller than said specific areas, and extracting a second photographic area among the divided areas.

14. An image processing device as claimed in claim 13, wherein
said second extracting means extracts the graphic area ahead of the character area from the data remaining after extracting the second photographic area from said image data.

15. An image processing device as claimed in claim 13, wherein
said second extracting means extracts the character area ahead of the graphic area from the data remaining after extracting the second photographic area from said image data.

16. An image processing device as claimed in claim 13, wherein
said first photographic area extraction process detects an edge of binary image that separates the photographic, graphic and character areas from a background area in said image data, and divides said image data into said multiple specific areas using the detected edge; and
said second photographic area extraction process detects an edge of the data remaining after extracting the first photographic area from said image data by means of said first photographic area extraction process, and divides said data into multiple areas that are smaller than said specific areas using the detected edge.

17. An image processing device as claimed in claim 13, further comprising:
an image reader for obtaining image data by reading a document, wherein
said image data to be processed is obtained by said image reader.

18. An image processing method comprising the steps of:
dividing mage data to be processed into multiple specific areas and extracting a first photographic area among the divided areas;
dividing the data remaining after extracting the first photographic area from said image data by said step of extracting the first photographic area into multiple areas that are smaller than said specific areas, and extracting a second photographic area among the divided areas; and
extracting the character and graphic areas from the data remaining after extracting the second photographic area from said image data.

19. A computer readable recording medium storing a computer program for performing the steps of:
dividing image data to be processed into multiple specific areas and extracting a first photographic area among the divided areas;
dividing the data remaining after extracting the first photographic area from said image data by said step of extracting the first photographic area into multiple areas that are smaller than said specific areas, and extracting a second photographic area among the divided areas; and extracting the character and graphic areas from the data remaining after extracting the second photographic area from said image data.

20. An image processing device comprising:

first extracting means for extracting a character area ahead of photographic and graphic areas from image data to be processed; and second extracting means for extracting the photographic area ahead of graphic area from the data remaining after extracting the character area from said image data;

wherein said second extracting means executes:

a first photographic area extraction process for dividing the data remaining after extracting the character area from said image data into multiple specific areas and extracting a first photographic area among the divided areas; and a second photographic area extraction process for dividing the data remaining after further extracting the first photographic area by said first photographic area extraction process from the data remaining after extracting the character area from said image data into multiple areas that are smaller than said specific areas, and extracting a second photographic area among the divided areas.

21. An image processing device as claimed in claim 20, wherein said first photographic area extraction process detects an edge of binary image that separates photographic and graphic areas from a background area in the data remaining after extracting the character area from said image data, and divides said data into said multiple specific areas using the detected edge; and said second photographic area extraction process detects an edge of the data remaining after further extracting the photographic area from the data remaining after extracting the character area from said image data, and divides said data remaining after further extracting into multiple areas that are smaller than said specific areas using the detected edge.

22. An image processing device as claimed in claim 20, further comprising:

an image reader for obtaining image data by reading a document, wherein said image data to be processed is obtained by said image reader.

23. An image processing device comprising, first extracting means for extracting a character area ahead of photographic and graphic areas from image data to be processed; and second extracting means for extracting the graphic area ahead of the photographic area from the data remaining after extracting the character area from said image data;

wherein said second extracting means executes:

a first graphic area extraction process for dividing the data remaining after extracting the character area from said image data into multiple specific areas and extracting a first graphic area among the divided areas; and a second graphic area extraction process for dividing the data remaining after further extracting the first graphic area by said first graphic area extraction process from the data remaining after extracting the character area from said image data into multiple areas that are smaller than said specific areas, and extracting a second graphic area among the divided areas.

24. An image processing device as claimed in claim 23, wherein said first graphic area extraction process detects an edge of binary image that separates photographic and graphic areas from a background area in the data remaining after extracting the character area from said image data, and divides said data into said multiple specific areas using the detected edge; and said second graphic area extraction process detects an edge of the data remaining after further extracting the graphic area from the data remaining after extracting the character area from said image data, and divides said data remaining after further extracting into multiple areas that are smaller than said specific areas using the detected edge.

25. An image processing device as claimed in claim 23, further comprising:

an image reader for obtaining image data by reading a document, wherein said image data to be processed is obtained by said image reader.

26. An image processing method comprising the steps of:

extracting a character area ahead of photographic and graphic areas from image data to be processed;

dividing the data remaining after extracting the character area from said image data into multiple specific areas and extracting a first photographic area among the divided areas; and dividing the data remaining after further extracting the photographic area by said step of extracting the first photographic area from the data remaining after extracting the character area from said image data into multiple areas that are smaller than said specific areas, and extracting a second photographic area among the divided areas extracting the graphic area from the data remaining after extracting the character and photographic areas from said image data.

27. A computer readable recording medium storing a computer program for performing the steps of:

extracting a character area ahead of photographic and graphic areas from image data to be processed;

dividing the data remaining after extracting the character area from said image data into multiple specific areas and extracting a first photographic area among the divided areas; and dividing the data remaining after further extracting the first photographic area by said step of extracting the photographic area from the data remaining after extracting the character area from said image data into multiple areas that are smaller than said specific areas, and extracting a second photographic area among the divided areas;

extracting the graphic area from the data remaining after extracting the character and photographic areas from said image data.

28. An image processing method comprising the steps of:

extracting a character area ahead of photographic and graphic areas from image data to be processed;

dividing the data remaining after extracting the character area from said image data into multiple specific areas and extracting a first graphic area among the divided areas; and dividing the data remaining after further extracting the graphic area by said step of extracting the first graphic area from the data remaining after extracting the character area from said image data into multiple areas that are smaller than said specific areas, and extracting a
second graphic area among the divided areas;
extracting the photographic area from the data remaining
after extracting the character and graphic areas from
said image data.

29. A computer readable recording medium storing a
computer program for performing the steps of:
extracting a character area ahead of photographic and
graphic areas from image data to be processed;
dividing the data remaining after extracting the character
area from said image data into multiple specific areas
and extracting a graphic area among the divided areas;
and
dividing the data remaining after further extracting the
graphic area by said step of extracting the graphic area
from the data remaining after extracting the character
area from said image data into multiple areas that are
smaller than said specific areas, and extracting a second
graphic area among the divided areas;
extracting the photographic area from the data remaining
after extracting the character and graphic areas from
said image data.

30. An image processing device comprising:
an extracting unit for specifying and extracting a photographic area ahead of graphic and character areas from image data to be processed; and
a separation unit for specifying and separating the graphic and character areas from the data in areas not specified yet and which are remaining after specifying and extracting the photographic area from said image data.

31. An image processing method comprising:
specifying and extracting a photographic area ahead of graphic and character areas from image data to be processed; and
specifying and separating the graphic and character areas from the data in areas not specified yet and which are remaining after specifying and extracting the photographic area from said image data.

32. A computer readable recording medium storing a computer program for performing the steps of:
specifying and extracting a photographic area ahead of graphic and character areas from image data to be processed; and
specifying and separating the graphic and character areas from the data in areas not specified yet and which are remaining after specifying and extracting the photographic area from said image data.

33. An image processing device comprising:
an area separation unit for separating areas into areas each of which areas has a different attribute,
said area separation unit executes:
a first area extraction process for dividing image data into multiple specific areas and extracting an area which is specified for a first attribute among the divided areas; and
a second area extraction process for dividing the data remaining after extracting the area which is specified for the first attribute from said image data by said first area extraction process into multiple areas that are smaller than said specific areas, and extracting an area which is specified for the first attribute among the divided areas.

34. An image processing method comprising:
dividing image data into multiple specific areas and extracting an area which is specified for a first attribute among the divided areas; and
dividing the data remaining after extracting the area which is specified for the first attribute from said image data into multiple areas that are smaller than said specific areas, and extracting an area which is specified for the first attribute among the divided areas so as to separate the image data into areas of different attributes.

35. A computer readable recording medium storing a program for performing the steps of:
dividing image data into multiple specific areas and extracting an area which is specified for a first attribute among the divided areas; and
dividing the data remaining after extracting the area which is specified for the first attribute from said image data into multiple areas that are smaller than said specific areas, and extracting an area which is specified for the first attribute among the divided areas so as to separate the image data into areas of different attributes.

36. An image processing apparatus comprising:
an area separation unit which separates image data into a plurality of areas and assigns at least one of a plurality of attributes to each first area, wherein a specific one of the attributes is given a priority over the remaining one(s) of the attributes; and
an image processing unit which processes each first area in accordance with the at least one attribute assigned thereto;
wherein, for each first area, said area separation unit assigns to a whole of the first area the specific one of the attributes if the whole of the first area is determined to be given the specific attribute, and
wherein, for each first area, said area separation unit assigns to only a second area, which is smaller than and included in the first area, the specific one of the attributes which is given priority over the remaining one(s) of the attributes, if only the second area is determined to be given the specific attribute.

37. The image processing apparatus of claim 36, further comprising:
an image reading unit which generates image data by reading an image of a document, wherein the area separation unit separates the image data generated by the image reading unit into the plurality of areas.

38. A method of image processing, the method comprising:
separating image data into a plurality of first areas and assigning at least one of a plurality of attributes to each first area, wherein a specific one of the attributes is given a priority over the remaining one(s) of the attributes; and
processing each first area in accordance with the at least one attribute assigned thereto;
wherein, for each first area, assigning to a whole of the first area the specific one of the attributes if the whole of the first area is determined to be given the specific attribute, and
wherein, for each first area, assigning to only a second area, which is smaller than and included in the first area, the specific one of the attributes which is given priority over the remaining one(s) of the attributes, if only the second area is determined to be given the specific attribute.

39. The method of claim 38, further comprising generating image data by reading an image of a document, wherein the area separation unit separates the image data generated by the image reading unit into the plurality of areas.

40. A computer readable medium storing a program for performing the steps of:

separating image data into a plurality of first areas and assigning at least one of a plurality of attributes to each first area, wherein a specific one of the attributes is given a priority over the remaining one(s) of the attributes; and processing each first area in accordance with the at least one attribute assigned thereto;

wherein, for each first area, assigning to a whole of the first area the specific one of the attributes, if the whole of the first area is determined to be given the specific attribute, and wherein, for each first area, assigning to only a second area, which is smaller than and included in the first area, the specific one of the attributes which is given priority over the remaining one(s) of the attributes, if only the second area is determined to be given the specific attribute.

41. The method of claim 40, further comprising generating image data by reading an image of a document, wherein the area separation unit separates the image data generated by the image reading unit into the plurality of areas.

* * * * *